US012331213B2

(12) United States Patent
Moren et al.

(10) Patent No.: US 12,331,213 B2
(45) Date of Patent: *Jun. 17, 2025

(54) INK-RECEPTIVE LAYERS FOR DURABLE LABELS

(71) Applicant: 3M INNOVATIVE PROPERTIES COMPANY, St. Paul, MN (US)

(72) Inventors: Dean M. Moren, North St. Paul, MN (US); Maciej P. Pietras, Wroclaw (PL); Rachna Khurana, Inver Grove Heights, MN (US); Benjamin R. Coonce, South St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1068 days.

This patent is subject to a terminal disclaimer.

(21) Appl. No.: 17/252,983

(22) PCT Filed: Jun. 27, 2019

(86) PCT No.: PCT/IB2019/055442
§ 371 (c)(1),
(2) Date: Dec. 16, 2020

(87) PCT Pub. No.: WO2020/003188
PCT Pub. Date: Jan. 2, 2020

(65) Prior Publication Data
US 2021/0214575 A1 Jul. 15, 2021

Related U.S. Application Data

(60) Provisional application No. 62/692,130, filed on Jun. 29, 2018.

(51) Int. Cl.
*C09D 167/00* (2006.01)
*B82Y 30/00* (2011.01)
*B82Y 40/00* (2011.01)
*C09D 7/40* (2018.01)
*C09D 7/61* (2018.01)
*C09D 7/63* (2018.01)

(52) U.S. Cl.
CPC ............ *C09D 167/00* (2013.01); *C09D 7/61* (2018.01); *C09D 7/63* (2018.01); *C09D 7/67* (2018.01); *C09D 7/68* (2018.01); *B82Y 30/00* (2013.01); *B82Y 40/00* (2013.01)

(58) Field of Classification Search
None
See application file for complete search history.

(56) References Cited

U.S. PATENT DOCUMENTS

| | | |
|---|---|---|
| 5,203,884 A | 4/1993 | Buchanan |
| 5,461,125 A | 10/1995 | Lu |
| 5,639,546 A | 6/1997 | Bilkadi |
| 6,077,656 A | 6/2000 | Majumdar |
| 6,150,036 A | 11/2000 | Lubar |
| 6,866,383 B2 | 3/2005 | Naik |
| 6,926,957 B2 | 8/2005 | Engel |
| 7,008,979 B2 | 3/2006 | Schottman |
| 7,393,571 B2 | 7/2008 | Chapman |
| 7,432,322 B2 | 10/2008 | Hood |
| 8,853,301 B2 | 10/2014 | Jing |
| 2003/0054175 A1* | 3/2003 | Okajima ............ C08G 18/706 428/323 |
| 2003/0143344 A1 | 7/2003 | Yau |
| 2003/0180480 A1 | 9/2003 | Fruge |
| 2003/0203991 A1* | 10/2003 | Schottman ............... C09D 7/61 523/334 |
| 2003/0224150 A1 | 12/2003 | Ludwig |
| 2004/0241347 A1 | 12/2004 | Tsujihata |
| 2005/0019508 A1 | 1/2005 | Engel |
| 2005/0031806 A1 | 2/2005 | Kim |
| 2006/0013971 A1 | 1/2006 | Chen |
| 2008/0033142 A1 | 2/2008 | Ogata |
| 2008/0081160 A1 | 4/2008 | Anderle |
| 2009/0324857 A1 | 12/2009 | Okuda |
| 2011/0200803 A1 | 8/2011 | Li |
| 2012/0010327 A1 | 1/2012 | Jing |
| 2014/0292951 A1 | 10/2014 | Ferrar |
| 2015/0166829 A1 | 6/2015 | Koger |
| 2015/0329742 A1 | 11/2015 | Baker |
| 2021/0124575 A1 | 4/2021 | Bell, IV |

FOREIGN PATENT DOCUMENTS

| | | | |
|---|---|---|---|
| CN | 103724646 A | * | 4/2014 |
| EP | 0250154 | | 12/1987 |
| EP | 0801602 | | 10/1997 |
| EP | 0803374 | | 10/1997 |
| EP | 0835186 | | 4/1998 |
| EP | 0995609 | | 4/2000 |
| EP | 2261043 | | 12/2010 |
| EP | 2355982 | | 8/2011 |
| EP | 2393665 | | 12/2011 |
| EP | 3080211 | | 10/2016 |
| JP | 09165552 A | * | 6/1997 |
| JP | 2005186365 A | * | 7/2005 |

(Continued)

OTHER PUBLICATIONS

International Search Report for PCT International Application No. PCT/IB2019/055442, mailed on Jan. 2, 2020, 4 pages.

*Primary Examiner* — Ha S Nguyen

(74) *Attorney, Agent, or Firm* — Kathleen B. Gross; Melissa E. Buss

(57) ABSTRACT

Coatable compositions for formation of ink-receptive layers, which may be aqueous suspensions, comprise a mixture of: a) colloidal silica particles; b) polyester polymers; c) polymers selected from the group consisting of polyurethane polymers and (meth)acrylate polymers; and d) crosslinkers. Ink-receptive layers, which may exhibit high gloss and high ink anchoring are also provided, as are constructions comprising such layers.

20 Claims, No Drawings

(56) References Cited

FOREIGN PATENT DOCUMENTS

| | | |
|---|---|---|
| WO | WO 1997-001448 | 1/1997 |
| WO | WO 1999-039914 | 8/1999 |
| WO | WO 2000-060024 | 10/2000 |
| WO | WO 2000-071360 | 11/2000 |
| WO | WO 2002-043965 | 6/2002 |
| WO | WO 2002-062894 | 8/2002 |
| WO | WO 2003-016045 | 2/2003 |
| WO | WO 2003-029015 | 4/2003 |
| WO | WO 2011-087997 | 7/2011 |
| WO | WO 2016-025319 | 2/2016 |
| WO | WO 2019-097469 | 5/2019 |

\* cited by examiner

INK-RECEPTIVE LAYERS FOR DURABLE LABELS

FIELD OF THE DISCLOSURE

This disclosure relates to printable durable labels, ink-receptive layers such as may form a part of such labels, and coatable compositions such as may be used to make such ink-receptive layers.

BACKGROUND OF THE DISCLOSURE

The following references may be relevant to the general field of technology of the present disclosure: U.S. Pat. No. 7,393,571; EP 0803374; US 2003/0180480; US 2006/0013971; WO 03/029015 A2; US 2015/0166829 A1; EP 3,080,211; US2003/0224150 A1; U.S. Pat. No. 5,461,125; WO 1999/039914 A1; US 2012/0010327 A1; US 2015/0329742; WO 2002/62894; US 2009/324857; US 2014/292951; EP 2,261,043; U.S. Pat. No. 6,150,036; WO 2016/025319 A; EP 0,801,602 B1; EP 1,419,048; EP 2,393,665; WO 0060024 A; US 2008/0081160; EP 0995609 B; WO 0243965; EP 0,835,186 B1; EP 0837778 A; US 2011/200803 A; EP 2,355,982 B1; and U.S. Pat. No. 7,432,322 B.

SUMMARY OF THE DISCLOSURE

Briefly, the present disclosure provides coatable compositions for formation of an ink receptive layer comprising a mixture of: a) 0-60 wt % (based on the total weight of a), b), c), and d)) of colloidal silica particles having an average particle size of 2.0-150 nm; b) 30-100 wt % (based on the total weight of a), b), c), and d)) of one or more polyester polymers; c) 0-10 wt % (based on the total weight of a), b), c), and d)) of one or more polymers selected from the group consisting of polyurethane polymers and (meth)acrylate polymers; and d) 0-10 wt % (based on the total weight of a), b), c), and d)) of one or more crosslinkers. For clarity, weight percentages refer to dry (solids) weight throughout unless otherwise stated. In some embodiments, the coatable composition is an aqueous suspension. In some embodiments, the one or more crosslinkers are present in an amount of at least 2.0 wt %, based on the total weight of a), b), c), and d). Additional embodiments of the coatable compositions of the present disclosure are described below under "Selected Embodiments."

In another aspect, the present disclosure provides coatable compositions for formation of an ink receptive layer comprising a mixture of: a) 0-15 wt % (based on the total weight of a), b), c), and d)) of colloidal silica particles having an average particle size of 2.0-150 nm; b) 75-90 wt % (based on the total weight of a), b), c), and d)) of one or more polyester polymers; c) 10-25 wt % (based on the total weight of a), b), c), and d)) of one or more polymers selected from the group consisting of polyurethane polymers and (meth)acrylate polymers; and d) 0-10 wt % (based on the total weight of a), b), c), and d)) of one or more crosslinkers. For clarity, weight percentages refer to dry (solids) weight throughout unless otherwise stated. In some embodiments, the coatable composition is an aqueous suspension. In some embodiments, the one or more crosslinkers are present in an amount of at least 2.0 wt %, based on the total weight of a), b), c), and d). Additional embodiments of the coatable compositions of the present disclosure are described below under "Selected Embodiments."

In another aspect, the present disclosure provides ink-receptive layers comprising a mixture of: I) 0-60 wt % (based on the total weight of I), b), c), and d)) of colloidal silica particles having an average particle size of 2.0-150 nm; and II) a crosslinked polymer obtained by reacting to form crosslinks a mixture of: b) 30-100 wt % (based on the total weight of I), b), c), and d)) of one or more polyester polymers; c) 0-10 wt % (based on the total weight of I), b), c), and d)) of one or more polymers selected from the group consisting of polyurethane polymers and (meth)acrylate polymers; and d) 0.1-10 wt % (based on the total weight of I), b), c), and d)) of one or more crosslinkers. For clarity, weight percentages refer to dry (solids) weight throughout unless otherwise stated. In some embodiments, the one or more polyester polymers in the ink-receptive layers include sulfonated polyester polymers. In some embodiments, the ink-receptive layers have a 60 degree gloss of at least 50, at least 70, at least 80, or in some embodiments at least 90. Additional embodiments of the ink-receptive layers of the present disclosure are described below under "Selected Embodiments."

In another aspect, the present disclosure provides ink-receptive layers comprising a mixture of: I) 0-15 wt % (based on the total weight of I), b), c), and d)) of colloidal silica particles having an average particle size of 2.0-150 nm; and II) a crosslinked polymer obtained by reacting to form crosslinks a mixture of: b) 75-90 wt % (based on the total weight of I), b), c), and d)) of one or more polyester polymers; c) 10-25 wt % (based on the total weight of I), b), c), and d)) of one or more polymers selected from the group consisting of polyurethane polymers and (meth)acrylate polymers; and d) 0.1-10 wt % (based on the total weight of I), b), c), and d)) of one or more crosslinkers. For clarity, weight percentages refer to dry (solids) weight throughout unless otherwise stated. In some embodiments, the one or more polyester polymers in the ink-receptive layers include sulfonated polyester polymers. In some embodiments, the ink-receptive layers have a 60 degree gloss of at least 50, at least 70, at least 80, or in some embodiments at least 90. Additional embodiments of the ink-receptive layers of the present disclosure are described below under "Selected Embodiments."

In another aspect, the present disclosure provides constructions comprising the ink-receptive layer according to the present disclosure bound to a substrate layer. In some embodiments, the substrate layer comprises a material selected from the group consisting of polyester, for example polyethylene terephthalate (PET), polypropylene (PP), vinyl and polyvinyl chloride (PVC). Additional embodiments of the constructions of the present disclosure are described below under "Selected Embodiments."

The preceding summary of the present disclosure is not intended to describe each embodiment of the present invention. The details of one or more embodiments of the invention are also set forth in the description below. Other features, objects, and advantages of the invention will be apparent from the description and from the claims.

In this application:

"water dispersible polymers" means polymers which may form or be obtained in the form of an aqueous solution, aqueous suspension, aqueous emulsion or aqueous latex;

"(meth)acrylate monomers" include acrylate monomers and methacrylate monomers; and "(meth)acrylate polymers" includes polymers that include units derived from acrylate monomers, polymers that include units derived from methacrylate monomers, and polymers that include both units derived from acrylate monomers and units derived from methacrylate monomers; and "non-syntactic" means, with regard to foamed or porous materials, that the majority of pores of the material are not created by addition of hollow structures such as, e.g., microballoons or hollow microspheres.

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides printable durable labels and components thereof, including ink-receptive layers, as well as coatable compositions such as may be used to make such ink-receptive layers.

The coatable compositions and ink-receptive layers contain small-diameter colloidal silica particles. Despite the silica particle content, the ink-receptive layers display high gloss, yet they also possess high affinity for printable inks. In addition, high scratch and smear resistance was also observed.

The coatable compositions of the present disclosure are typically aqueous suspensions. In some embodiments, all constituents of the suspension other than water or solvents are in suspension. In some embodiments, some constituents of the suspension are in suspension and some are partly or fully dissolved. In some embodiments, the suspension is in water without additional solvents. In some embodiments, the suspension is in water and additional water-miscible solvents. In some embodiments, the suspension is in water and additional water-soluble solvents. The coatable composition of the present disclosure may optionally include a coalescing agent. Any suitable coalescing agent may be used in the practice of the present disclosure. In some embodiments, the coalescing agent may be one or more of N-methylpyrrolidone (NMP) or di(propylene glycol) methyl ether (DPGME). In some embodiments, the suspension has a pH of 4-10, in some 5-9, and in some 6-8.

The coatable composition of the present disclosure may be made by any suitable means. Typically, the coatable composition of the present disclosure may be made by mixing of its components. In some embodiments, the coatable composition of the present disclosure is maintained at a high pH during mixing, in some embodiments at a pH of 4-10, in some 5-9, and in some 6-8.

Any suitable colloidal silica may be used in the practice of the present disclosure. Colloidal silica is a form of silicon dioxide having an amorphous structure, distinguished from crystalline forms of silicon dioxide. Colloidal silica may comprise approximately spherical particles. Colloidal silica may comprise particles having an average diameter of 2 to 150 nanometers. Colloidal silica may be maintained in a largely unaggregated and unagglomerated form, typically in aqueous suspension at basic pH or slightly acidic. Colloidal silica is distinguished from non-colloidal silica such as fumed silica and silica gels, which comprise aggregated, agglomerated, or fused silica particles. Colloidal silica used in the practice of the present disclosure have an average particle diameter of 2 to 150 nanometers, in some such embodiments greater than 3 nanometers, in some greater than 4 nanometers, in some greater than 6 nanometers, in some greater than 7 nanometers, in some greater than 8 nanometers, in some greater than 13 nanometers, and in some greater than 18 nanometers. In some such embodiments, average silica particle diameter is less than 115 nanometers, in some less than 95 nanometers, in some less than 75 nanometers, in some less than 48 nanometers, in some less than 32 nanometers, and in some such embodiments less than 27 nanometers. In some embodiments, the silica particles are monodisperse, where 90% or more of the particles fall within +/−3 nm, +/−5 nm, or +/−10 nm of the average particle diameter. In some embodiments the silica particles are not surface-modified. In some embodiments the silica particles are not surface-modified by attachment of organic molecules to the particle surface. In some embodiments the silica particles are not surface-modified by covalent attachment of organic molecules to the particle surface. In some embodiments the silica particles are not surface-modified by ionic attachment of organic molecules to the particle surface. In some embodiments, the silica particles comprise hydroxy groups (e.g., in the form of silanol groups) on the particle surface.

Any suitable polyester polymers may be used in the practice of the present disclosure. In some embodiments, suitable polyester polymers are sulfonated. In some embodiments, suitable polyester polymers are not sulfonated. Suitable sulfonated and non-sulfonated polyester polymers may include those described in WO 03/029015, the content of which is herein incorporated by reference. In some embodiments, suitable polyester polymers are copolyesters. In some embodiments, suitable polyester polymers are polyester-polyether copolyesters. In some embodiments, suitable polyester polymers are grafted with additional polymeric material. In some embodiments, suitable polyester polymers are not grafted with additional polymeric material. In some embodiments, suitable polyester polymers are branched. In some embodiments, suitable polyester polymers are not branched. In some embodiments, suitable polyester polymers are carboxyl-terminated. In some embodiments, suitable polyester polymers are hydroxy-terminated. In some embodiments, suitable polyester polymers comprise not more than 40 weight percent of monomer units derived from monomers other than polyacid or polyol monomers, in some not more than 30 weight percent, in some not more than 20 weight percent, in some not more than 10 weight percent, in some not more than 5 weight percent, and in some embodiments not more than 1 weight percent.

Any suitable polyurethane polymers may be used in the practice of the present disclosure. In some embodiments, suitable polyurethane polymers have an aliphatic backbone structure. In some embodiments, suitable polyurethane polymers are non-aromatic. In some embodiments, suitable polyurethane polymers are grafted with additional polymeric material. In some embodiments, suitable polyurethane polymers are not grafted with additional polymeric material. In some embodiments, suitable polyurethane polymers are branched. In some embodiments, suitable polyurethane polymers are not branched. In some embodiments, suitable polyurethane polymers are carboxyl-terminated. In some embodiments, suitable polyurethane polymers comprise not more than 40 weight percent of monomer units derived from monomers other than polyisocyanate or polyols monomers, in some not more than 30 weight percent, in some not more than 20 weight percent, in some not more than 10 weight percent, in some not more than 5 weight percent, and in some embodiments not more than 1 weight percent.

Any suitable (meth)acrylate polymers may be used in the practice of the present disclosure. In some embodiments, suitable (meth)acrylate polymers are in the form of a core-shell particles in a latex. Suitable (meth)acrylate polymers, including core-shell (meth)acrylate polymers, may include those described in U.S. Pat. No. 5,461,125, the content of which is herein incorporated by reference. In some embodiments, suitable (meth)acrylate polymers are grafted with additional polymeric material. In some embodiments, suitable (meth)acrylate polymers are not grafted with additional polymeric material. In some embodiments, suitable (meth)acrylate polymers are branched. In some embodiments, suitable (meth)acrylate polymers are not branched. In some embodiments, suitable (meth)acrylate polymers comprise not more than 40 weight percent of monomer units derived from monomers other than (meth)acrylate monomers, in some not more than 30 weight percent, in some not more than 20 weight percent, in some not more than 10 weight percent, in some not more than 5 weight percent, and in some embodiments not more than 1 weight percent.

Any suitable crosslinkers may be used in the practice of the present disclosure. In some embodiments, suitable crosslinkers are reactive with polyesters. In some embodiments, suitable crosslinkers are reactive with polyesters and polyurethanes. In some embodiments, suitable crosslinkers are reactive with polyesters and (meth)acrylates. In some embodiments, the crosslinkers are selected from polyaziridines comprising two or more aziridine groups. In some embodiments, the crosslinkers are selected from carbodiimide crosslinkers. In some embodiments, the crosslinkers are selected from isocyanate crosslinkers. In some embodiments, the crosslinkers are selected from silane crosslinkers. In some embodiments, the crosslinkers are selected from metal complex crosslinkers. In some embodiments, the crosslinkers are selected from UV-activated crosslinking systems. In some embodiments, the crosslinkers do not include UV-activated crosslinking systems. In some embodiments, the crosslinkers are heat-activated crosslinking systems.

Ink-receptive layers according to the present disclosure may be made by any suitable means. In some embodiments, ink-receptive layers according to the present disclosure are made by coating out the coatable composition of the present disclosure. Coating may be accomplished by any suitable means, which may include spraying, bar coating, dipping, brushing, curtain coating, roll coating, gravure coating, screen printing, and the like. In some embodiments, coating is performed on a substrate. In some embodiments, coating step(s) may be followed by drying steps. In some embodiments, coating step(s) may be followed by steps promoting reaction of crosslinker(s), if present, with polymers. In some embodiments, drying steps and steps promoting reaction of crosslinker(s) are carried out simultaneously, e.g., by application of heat. In some embodiments, steps promoting reaction of crosslinker(s) are carried out by application of UV radiation.

Any suitable substrates may be used in the practice of the present disclosure. In some embodiments, the substrate may comprise one or more of polyester, for example polyethylene terephthalate (PET), polypropylene (PP), vinyl, polyolefins or polyvinyl chloride (PVC). In some embodiments, additional layers may be added to the substrate. In some embodiments, such additional layers may include adhesive layers. In some embodiments, the substrate bears an adhesive layer on the face opposite the face bearing the ink-receptive layer. In some such embodiments, the adhesive is a pressure sensitive adhesive (PSA). In some embodiments including an adhesive layer, the adhesive layer is covered with a liner.

In some embodiments, the ink-receptive layer of the present disclosure readily anchors one, more, or many inks types, which may include one or more of: water-based inks, organic solvent-based inks, and UV curable inks. In some embodiments, the ink-receptive layer of the present disclosure may be readily used with one, more, or many printing technologies, which may include one or more of: flexographic, ink jet, and thermal transfer technologies.

In some embodiments, the ink-receptive layers may exhibit an unusual microporous structure due to the inclusion of fine colloidal silica. Without wishing to be bound by theory, applicants believe that such a structure may play a role in the ability of the ink-receptive layers of the present disclosure to simultaneously achieve conflicting goals: high gloss, high affinity for printable inks, and high durability (e.g., high scratch and smear resistance).

In some embodiments, the ink-receptive layers exhibit unusual surface smoothness. In some embodiments, surface smoothness (i.e., lack of roughness) may be measured by atomic force microscopy (AFM). In some embodiments, the ink-receptive layers exhibit surface smoothness to the extent that Ra is less than 35 nm, in some embodiments less than 30 nm, in some embodiments less than 25 nm, and in some embodiments less than 20 nm, despite inclusion of colloidal silica particles. In some embodiments, the ink-receptive layers exhibit surface smoothness to the extent that Rq is less than 30 nm, in some embodiments less than 25 nm, in some embodiments less than 20 nm, and in some embodiments less than 10 nm, despite inclusion of colloidal silica particles.

Additional embodiments may include those limited to the compositions or ranges recited in the Selected Embodiments below.

SELECTED EMBODIMENTS

The following embodiments, designated by letter and number, are intended to further illustrate the present disclosure but should not be construed to unduly limit this disclosure.

CC1. A coatable composition for formation of an ink-receptive layer, the coatable composition comprising a mixture of:
  a) 0-60 wt %, based on the total weight of a), b), c), and d), of colloidal silica particles having an average particle size of 2.0-150 nm;
  b) 30-100 wt %, based on the total weight of a), b), c), and d), of one or more polyester polymers;
  c) 0-10 wt %, based on the total weight of a), b), c), and d), of one or more polymers selected from the group consisting of polyurethane polymers and (meth)acrylate polymers; and
  d) 0-10 wt %, based on the total weight of a), b), c), and d), of one or more crosslinkers.

CC2. The coatable composition according to embodiment CC1 which is an aqueous suspension.

CC3. The coatable composition according to any of the previous embodiments wherein the colloidal silica particles are present in an amount of at least 8.0 wt %, based on the total weight of a), b), c), and d).

CC4. The coatable composition according to any of the previous embodiments wherein the colloidal silica particles are present in an amount of at least 18.0 wt %, based on the total weight of a), b), c), and d).

CC5. The coatable composition according to any of the previous embodiments wherein the colloidal silica particles are present in an amount of at least 27.0 wt %, based on the total weight of a), b), c), and d).

CC6. The coatable composition according to any of the previous embodiments wherein the colloidal silica particles are present in an amount of at least 38.0 wt %, based on the total weight of a), b), c), and d).

CC7. The coatable composition according to any of the previous embodiments wherein the colloidal silica particles are present in an amount of at least 42.0 wt %, based on the total weight of a), b), c), and d).

CC8. The coatable composition according to any of the previous embodiments wherein the colloidal silica particles are present in an amount of not more than 55.0 wt %, based on the total weight of a), b), c), and d).

CC9. The coatable composition according to any of the previous embodiments wherein the colloidal silica particles are present in an amount of not more than 50.0 wt %, based on the total weight of a), b), c), and d).

CC10. The coatable composition according to any of the previous embodiments wherein the colloidal silica particles are present in an amount of not more than 45.0 wt %, based on the total weight of a), b), c), and d).

CC11. The coatable composition according to any of the previous embodiments wherein the colloidal silica particles have an average particle size of at least 4.0 nm.

CC12. The coatable composition according to any of the previous embodiments wherein the colloidal silica particles have an average particle size of at least 13.0 nm.

CC13. The coatable composition according to any of the previous embodiments wherein the colloidal silica particles have an average particle size of not more than 95.0 nm.

CC14. The coatable composition according to any of the previous embodiments wherein the colloidal silica particles have an average particle size of not more than 48.0 nm.

CC15. The coatable composition according to any of the previous embodiments wherein the colloidal silica particles have an average particle size of not more than 35.0 nm.

CC16. The coatable composition according to any of the previous embodiments wherein the colloidal silica particles have an average particle size of not more than 27.0 nm.

CC17. The coatable composition according to any of the previous embodiments wherein the one or more polyester polymers are present in an amount of at least 35.0 wt %, based on the total weight of a), b), c), and d).

CC18. The coatable composition according to any of the previous embodiments wherein the one or more polyester polymers are present in an amount of at least 40.0 wt %, based on the total weight of a), b), c), and d).

CC19. The coatable composition according to any of the previous embodiments wherein the one or more polyester polymers are present in an amount of at least 45.0 wt %, based on the total weight of a), b), c), and d).

CC20. The coatable composition according to any of the previous embodiments wherein the one or more polyester polymers are present in an amount of not more than 48.0 wt %, based on the total weight of a), b), c), and d).

CC21. The coatable composition according to any of the previous embodiments wherein the one or more polyester polymers are present in an amount of not more than 80.0 wt %, based on the total weight of a), b), c), and d).

CC22. The coatable composition according to any of the previous embodiments wherein the one or more polyester polymers are present in an amount of not more than 92.0 wt %, based on the total weight of a), b), c), and d).

CC23. The coatable composition according to any of the previous embodiments wherein c) is present in an amount of 0.0 wt %, based on the total weight of a), b), c), and d).

CC24. The coatable composition according to any of the previous embodiments wherein c) is present in an amount of at least 0.1 wt %, based on the total weight of a), b), c), and d).

CC25. The coatable composition according to any of the previous embodiments wherein c) is present in an amount of at least 1.0 wt %, based on the total weight of a), b), c), and d).

CC26. The coatable composition according to any of the previous embodiments wherein c) is present in an amount of not more than 6.0 wt %, based on the total weight of a), b), c), and d).

CC27. The coatable composition according to any of the previous embodiments wherein c) is present in an amount of not more than 4.0 wt %, based on the total weight of a), b), c), and d).

CC28. The coatable composition according to any of the previous embodiments wherein c) is present in an amount of not more than 2.0 wt %, based on the total weight of a), b), c), and d).

CC29. The coatable composition according to any of the previous embodiments wherein c) is present in an amount of not more than 1.0 wt %, based on the total weight of a), b), c), and d).

CC30. The coatable composition according to any of the previous embodiments wherein the one or more crosslinkers are present in an amount of at least 0.1 wt %, based on the total weight of a), b), c), and d).

CC31. The coatable composition according to any of the previous embodiments wherein the one or more crosslinkers are present in an amount of at least 2.0 wt %, based on the total weight of a), b), c), and d).

CC32. The coatable composition according to any of the previous embodiments wherein the one or more crosslinkers are present in an amount of at least 4.0 wt %, based on the total weight of a), b), c), and d).

CC33. The coatable composition according to any of the previous embodiments wherein the one or more crosslinkers are present in an amount of not more than 7.0 wt %, based on the total weight of a), b), c), and d).

CC34. The coatable composition according to any of the previous embodiments wherein the one or more crosslinkers are present in an amount of not more than 6.0 wt %, based on the total weight of a), b), c), and d).

CC35. The coatable composition according to any of the previous embodiments wherein the one or more polyester polymers include sulfonated polyester polymers.

CC36. The coatable composition according to any of the previous embodiments wherein the one or more polyester polymers include non-sulfonated polyester polymers.

CC37. The coatable composition according to any of embodiments CC1-CC34 wherein the one or more polyester polymers are sulfonated polyester polymers.

CC38. The coatable composition according to any of embodiments CC1-CC34 wherein the one or more polyester polymers are non-sulfonated polyester polymers.

CC39. The coatable composition according to any of the previous embodiments wherein c) includes one or more polyurethane polymers.

CC40. The coatable composition according to any of the previous embodiments wherein c) includes one or more polyurethane polymers having an aliphatic backbone.

CC41. The coatable composition according to any of the previous embodiments wherein c) includes one or more (meth)acrylate polymers.

CC42. The coatable composition according to any of the previous embodiments wherein c) includes one or more (meth)acrylate polymers in the form of core-shell particles.

CC43. The coatable composition according to any of embodiments CC1-CC38 wherein c) is one or more polyurethane polymers.

CC44. The coatable composition according to any of embodiments CC1-CC38 wherein c) is one or more polyurethane polymers having an aliphatic backbone.

CC45. The coatable composition according to any of embodiments CC1-CC38 wherein c) is one or more (meth)acrylate polymers.

CC46. The coatable composition according to any of embodiments CC1-CC38 wherein c) is one or more (meth)acrylate polymers in the form of core-shell particles.

CC47. The coatable composition according to any of the previous embodiments wherein the one or more crosslinkers include one or more polyaziridines.

CC48. The coatable composition according to any of embodiments CC1-CC46 wherein the one or more crosslinkers are one or more polyaziridines.

CT1. A coatable composition for formation of an ink-receptive layer, the coatable composition comprising a mixture of:
- a) 0-15 wt %, based on the total weight of a), b), c), and d), of colloidal silica particles having an average particle size of 2.0-150 nm;
- b) 75-90 wt %, based on the total weight of a), b), c), and d), of one or more polyester polymers;
- c) 10-25 wt %, based on the total weight of a), b), c), and d), of one or more polymers selected from the group consisting of polyurethane polymers and (meth)acrylate polymers; and
- d) 0-10 wt %, based on the total weight of a), b), c), and d), of one or more crosslinkers.

CT2. The coatable composition according to embodiment CT1 which is an aqueous suspension.

CT3. The coatable composition according to any of embodiments CT1 or CT2 wherein the colloidal silica particles are present in an amount of at least 1.0 wt %, based on the total weight of a), b), c), and d).

CT4. The coatable composition according to any of embodiments CT1 or CT2 wherein the colloidal silica particles are present in an amount of at least 2.0 wt %, based on the total weight of a), b), c), and d).

CT5. The coatable composition according to any of embodiments CT1 or CT2 wherein the colloidal silica particles are present in an amount of at least 4.0 wt %, based on the total weight of a), b), c), and d).

CT6. The coatable composition according to any of embodiments CT1 or CT2 wherein the colloidal silica particles are present in an amount of at least 8.0 wt %, based on the total weight of a), b), c), and d).

CT7. The coatable composition according to any of embodiments CT1 or CT2 wherein the colloidal silica particles are present in an amount of at least 10.0 wt %, based on the total weight of a), b), c), and d).

CT8. The coatable composition according to any of embodiments CT1-CT7 wherein the colloidal silica particles are present in an amount of not more than 12.0 wt %, based on the total weight of a), b), c), and d).

CT9. The coatable composition according to any of embodiments CT1-CT6 wherein the colloidal silica particles are present in an amount of not more than 10.0 wt %, based on the total weight of a), b), c), and d).

CT10. The coatable composition according to any of embodiments CT1-CT5 wherein the colloidal silica particles are present in an amount of not more than 8.0 wt %, based on the total weight of a), b), c), and d).

CT11. The coatable composition according to any of embodiments CT1-CT10 wherein the colloidal silica particles have an average particle size of at least 4.0 nm.

CT12. The coatable composition according to any of embodiments CT1-CT10 wherein the colloidal silica particles have an average particle size of at least 13.0 nm.

CT13. The coatable composition according to any of embodiments CT1-CT12 wherein the colloidal silica particles have an average particle size of not more than 95.0 nm.

CT14. The coatable composition according to any of embodiments CT1-CT12 wherein the colloidal silica particles have an average particle size of not more than 48.0 nm.

CT15. The coatable composition according to any of embodiments CT1-CT12 wherein the colloidal silica particles have an average particle size of not more than 35.0 nm.

CT16. The coatable composition according to any of embodiments CT1-CT12 wherein the colloidal silica particles have an average particle size of not more than 27.0 nm.

CT17. The coatable composition according to any of embodiments CT1-CT16 wherein the one or more polyester polymers are present in an amount of at least 77.0 wt %, based on the total weight of a), b), c), and d).

CT18. The coatable composition according to any of embodiments CT1-CT16 wherein the one or more polyester polymers are present in an amount of at least 80.0 wt %, based on the total weight of a), b), c), and d).

CT19. The coatable composition according to any of embodiments CT1-CT16 wherein the one or more polyester polymers are present in an amount of at least 85.0 wt %, based on the total weight of a), b), c), and d).

CT20. The coatable composition according to any of embodiments CT1-CT18 wherein the one or more polyester polymers are present in an amount of not more than 85.0 wt %, based on the total weight of a), b), c), and d).

CT21. The coatable composition according to any of embodiments CT1-CT18 wherein the one or more polyester polymers are present in an amount of not more than 83.0 wt %, based on the total weight of a), b), c), and d).

CT22. The coatable composition according to any of embodiments CT1-CT17 wherein the one or more polyester polymers are present in an amount of not more than 80.0 wt %, based on the total weight of a), b), c), and d).

CT23. The coatable composition according to any of embodiments CT1-CT22 wherein c) is present in an amount of at least 12.0 wt %, based on the total weight of a), b), c), and d).

CT24. The coatable composition according to any of embodiments CT1-CT22 wherein c) is present in an amount of at least 13.0 wt %, based on the total weight of a), b), c), and d).

CT25. The coatable composition according to any of embodiments CT1-CT22 wherein c) is present in an amount of at least 14.0 wt %, based on the total weight of a), b), c), and d).

CT26. The coatable composition according to any of embodiments CT1-CT25 wherein c) is present in an amount of not more than 22.0 wt %, based on the total weight of a), b), c), and d).

CT27. The coatable composition according to any of embodiments CT1-CT25 wherein c) is present in an amount of not more than 20.0 wt %, based on the total weight of a), b), c), and d).

CT28. The coatable composition according to any of embodiments CT1-CT25 wherein c) is present in an amount of not more than 18.0 wt %, based on the total weight of a), b), c), and d).

CT29. The coatable composition according to any of embodiments CT1-CT25 wherein c) is present in an amount of not more than 15.0 wt %, based on the total weight of a), b), c), and d).

CT30. The coatable composition according to any of embodiments CT1-CT29 wherein the one or more crosslinkers are present in an amount of at least 0.1 wt %, based on the total weight of a), b), c), and d).

CT31. The coatable composition according to any of embodiments CT1-CT29 wherein the one or more crosslinkers are present in an amount of at least 1.0 wt %, based on the total weight of a), b), c), and d).

CT32. The coatable composition according to any of embodiments CT1-CT29 wherein the one or more crosslinkers are present in an amount of at least 2.0 wt %, based on the total weight of a), b), c), and d).

CT33. The coatable composition according to any of embodiments CT1-CT32 wherein the one or more crosslinkers are present in an amount of not more than 7.0 wt %, based on the total weight of a), b), c), and d).

CT34. The coatable composition according to any of embodiments CT1-CT32 wherein the one or more crosslinkers are present in an amount of not more than 4.0 wt %, based on the total weight of a), b), c), and d).

CT35. The coatable composition according to any of embodiments CT1-CT34 wherein the one or more polyester polymers include sulfonated polyester polymers.

CT36. The coatable composition according to any of embodiments CT1-CT35 wherein the one or more polyester polymers include non-sulfonated polyester polymers.

CT37. The coatable composition according to any of embodiments CT1-CT34 wherein the one or more polyester polymers are sulfonated polyester polymers.

CT38. The coatable composition according to any of embodiments CT1-CT34 wherein the one or more polyester polymers are non-sulfonated polyester polymers.

CT39. The coatable composition according to any of embodiments CT1-CT38 wherein c) includes one or more polyurethane polymers.

CT40. The coatable composition according to any of embodiments CT1-CT39 wherein c) includes one or more polyurethane polymers having an aliphatic backbone.

CT41. The coatable composition according to any of embodiments CT1-CT40 wherein c) includes one or more (meth)acrylate polymers.

CT42. The coatable composition according to any of embodiments CT1-CT41 wherein c) includes one or more (meth)acrylate polymers in the form of core-shell particles.

CT43. The coatable composition according to any of embodiments CT1-CT38 wherein c) is one or more polyurethane polymers.

CT44. The coatable composition according to any of embodiments CT1-CT38 wherein c) is one or more polyurethane polymers having an aliphatic backbone.

CT45. The coatable composition according to any of embodiments CT1-CT38 wherein c) is one or more (meth)acrylate polymers.

CT46. The coatable composition according to any of embodiments CT1-CT38 wherein c) is one or more (meth)acrylate polymers in the form of core-shell particles.

CT47. The coatable composition according to any of embodiments CT1-CT46 wherein the one or more crosslinkers include one or more polyaziridines.

CT48. The coatable composition according to any of embodiments CT1-CT46 wherein the one or more crosslinkers are one or more polyaziridines.

CT49. A coatable composition which is the coatable composition according to any one or more of embodiments CC1-CC48 or CT1-CT48.

LX1. An ink-receptive layer comprising a mixture of:
    I) 0-60 wt %, based on the total weight of I), b), c), and d), of colloidal silica particles having an average particle size of 2.0-150 nm; and
    II) crosslinked polymer obtained by reacting to form crosslinks a mixture of:
        b) 30-100 wt %, based on the total weight of I), b), c), and d), of one or more polyester polymers;
        c) 0-10 wt %, based on the total weight of I), b), c), and d), of one or more polymers selected from the group consisting of polyurethane polymers and (meth)acrylate polymers; and
        d) 0.1-10 wt %, based on the total weight of I), b), c), and d), of one or more crosslinkers.

LX2. The ink-receptive layer according to embodiment LX1 wherein the colloidal silica particles are present in an amount of at least 8.0 wt %, based on the total weight of I), b), c), and d).

LX3. The ink-receptive layer according to embodiment LX1 wherein the colloidal silica particles are present in an amount of at least 18.0 wt %, based on the total weight of I), b), c), and d).

LX4. The ink-receptive layer according to any embodiment LX1 wherein the colloidal silica particles are present in an amount of at least 27.0 wt %, based on the total weight of I), b), c), and d).

LX5. The ink-receptive layer according to embodiment LX1 wherein the colloidal silica particles are present in an amount of at least 38.0 wt %, based on the total weight of I), b), c), and d).

LX6. The ink-receptive layer according to embodiment LX1 wherein the colloidal silica particles are present in an amount of at least 42.0 wt %, based on the total weight of I), b), c), and d).

LX7. The ink-receptive layer according to any of embodiments LX1-LX6 wherein the colloidal silica particles are present in an amount of not more than 55.0 wt %, based on the total weight of I), b), c), and d).

LX8. The ink-receptive layer according to any of embodiments LX1-LX6 wherein the colloidal silica particles are present in an amount of not more than 50.0 wt %, based on the total weight of I), b), c), and d).

LX9. The ink-receptive layer according to any of embodiments LX1-LX6 wherein the colloidal silica particles are present in an amount of not more than 45.0 wt %, based on the total weight of I), b), c), and d).

LX10. The ink-receptive layer according to any of embodiments LX1-LX9 wherein the colloidal silica particles have an average particle size of at least 4.0 nm.

LX11. The ink-receptive layer according to any of embodiments LX1-LX9 wherein the colloidal silica particles have an average particle size of at least 13.0 nm.

LX12. The ink-receptive layer according to any of embodiments LX1-LX11 wherein the colloidal silica particles have an average particle size of not more than 95.0 nm.

LX13. The ink-receptive layer according to any of embodiments LX1-LX11 wherein the colloidal silica particles have an average particle size of not more than 48.0 nm.

LX14. The ink-receptive layer according to any of embodiments LX1-LX11 wherein the colloidal silica particles have an average particle size of not more than 35.0 nm.

LX15. The ink-receptive layer according to any of embodiments LX1-LX11 wherein the colloidal silica particles have an average particle size of not more than 27.0 nm.

LX16. The ink-receptive layer according to any of embodiments LX1-LX15 wherein the one or more polyester polymers are present in an amount of at least 35.0 wt %, based on the total weight of b), c), and d).

LX17. The ink-receptive layer according to any of embodiments LX1-LX15 wherein the one or more polyester polymers are present in an amount of at least 40.0 wt %, based on the total weight of b), c), and d).

LX18. The ink-receptive layer according to any of embodiments LX1-LX15 wherein the one or more polyester polymers are present in an amount of at least 45.0 wt %, based on the total weight of b), c), and d).

LX19. The ink-receptive layer according to any of embodiments LX1-LX15 wherein the one or more polyester polymers are present in an amount of not more than 48.0 wt %, based on the total weight of b), c), and d).

LX20. The ink-receptive layer according to any of embodiments LX1-LX19 wherein the one or more polyester polymers are present in an amount of not more than 80.0 wt %, based on the total weight of b), c), and d).

LX21. The ink-receptive layer according to any of embodiments LX1-LX19 wherein the one or more polyester polymers are present in an amount of not more than 92.0 wt %, based on the total weight of b), c), and d).

LX22. The ink-receptive layer according to any of embodiments LX1-LX21 wherein c) is present in an amount of 0.0 wt %, based on the total weight of b), c), and d).

LX23. The ink-receptive layer according to any of embodiments LX1-LX21 wherein c) is present in an amount of at least 0.1 wt %, based on the total weight of b), c), and d).

LX24. The ink-receptive layer according to any of embodiments LX1-LX21 wherein c) is present in an amount of at least 1.0 wt %, based on the total weight of b), c), and d).

LX25. The ink-receptive layer according to any of embodiments LX1-LX24 wherein c) is present in an amount of not more than 6.0 wt %, based on the total weight of b), c), and d).

LX26. The ink-receptive layer according to any of embodiments LX1-LX24 wherein c) is present in an amount of not more than 4.0 wt %, based on the total weight of b), c), and d).

LX27. The ink-receptive layer according to any of embodiments LX1-LX24 wherein c) is present in an amount of not more than 2.0 wt %, based on the total weight of b), c), and d).

LX28. The ink-receptive layer according to any of embodiments LX1-LX24 wherein c) is present in an amount of not more than 1.0 wt %, based on the total weight of b), c), and d).

LX29. The ink-receptive layer according to any of embodiments LX1-LX28 wherein the one or more crosslinkers are present in an amount of at least 0.5 wt %, based on the total weight of b), c), and d).

LX30. The ink-receptive layer according to any of embodiments LX1-LX28 wherein the one or more crosslinkers are present in an amount of at least 2.0 wt %, based on the total weight of b), c), and d).

LX31. The ink-receptive layer according to any of embodiments LX1-LX28 wherein the one or more crosslinkers are present in an amount of at least 4.0 wt %, based on the total weight of b), c), and d).

LX32. The ink-receptive layer according to any of embodiments LX1-LX31 wherein the one or more crosslinkers are present in an amount of not more than 7.0 wt %, based on the total weight of b), c), and d).

LX33. The ink-receptive layer according to any of embodiments LX1-LX31 wherein the one or more crosslinkers are present in an amount of not more than 6.0 wt %, based on the total weight of b), c), and d).

LX34. The ink-receptive layer according to any of embodiments LX1-LX33 wherein the one or more polyester polymers include sulfonated polyester polymers.

LX35. The ink-receptive layer according to any of embodiments LX1-LX34 wherein the one or more polyester polymers include non-sulfonated polyester polymers.

LX36. The ink-receptive layer according to any of embodiments LX1-LX33 wherein the one or more polyester polymers are sulfonated polyester polymers.

LX37. The ink-receptive layer according to any of embodiments LX1-LX33 wherein the one or more polyester polymers are non-sulfonated polyester polymers.

LX38. The ink-receptive layer according to any of embodiments LX1-LX37 wherein c) includes one or more polyurethane polymers.

LX39. The ink-receptive layer according to any of embodiments LX1-LX38 wherein c) includes one or more polyurethane polymers having an aliphatic backbone.

LX40. The ink-receptive layer according to any of embodiments LX1-LX39 wherein c) includes one or more (meth)acrylate polymers.

LX41. The ink-receptive layer according to any of embodiments LX1-LX40 wherein c) includes one or more (meth)acrylate polymers in the form of core-shell particles.

LX42. The ink-receptive layer according to any of embodiments LX1-LX37 wherein c) is one or more polyurethane polymers.

LX43. The ink-receptive layer according to any of embodiments LX1-LX37 wherein c) is one or more polyurethane polymers having an aliphatic backbone.

LX44. The ink-receptive layer according to any of embodiments LX1-LX37 wherein c) is one or more (meth)acrylate polymers.

LX45. The ink-receptive layer according to any of embodiments LX1-LX37 wherein c) is one or more (meth)acrylate polymers in the form of core-shell particles.

LX46. The ink-receptive layer according to any of embodiments LX1-LX45 wherein the one or more crosslinkers include one or more polyaziridines.

LX47. The ink-receptive layer according to any of embodiments LX1-LX45 wherein the one or more crosslinkers are one or more polyaziridines.

LX48. The ink-receptive layer according to any of embodiments LX1-LX47 having a 60 degree gloss of at least 50.

LX49. The ink-receptive layer according to any of embodiments LX1-LX47 having a 60 degree gloss of at least 70.

LX50. The ink-receptive layer according to any of embodiments LX1-LX47 having a 60 degree gloss of at least 80.

LX51. The ink-receptive layer according to any of embodiments LX1-LX47 having a 60 degree gloss of at least 90.

LX52. The ink-receptive layer according to any of embodiments LX1-LX51 which includes pores having a diameter of 0.05 micrometers or greater, and wherein such pores are present in a density such that a cross-section of the ink-receptive layer intersects 1 or more of such pores per 4.0 square micrometers.

LX53. The ink-receptive layer according to any of embodiments LX1-LX51 which includes pores having a diameter of 0.05 micrometers or greater, and wherein such pores are present in a density such that a cross-section of the ink-receptive layer intersects 3 or more of such pores per 4.0 square micrometers.

LX54. The ink-receptive layer according to any of embodiments LX1-LX51 which includes pores having a diameter of 0.05 micrometers or greater, and wherein such pores are present in a density such that a cross-section of the ink-receptive layer intersects 8 or more of such pores per 4.0 square micrometers.

LX55. The ink-receptive layer according any of embodiments LX1-LX51 which includes pores having a diameter of 0.1 micrometers or greater, and wherein such pores are present in a density such that a cross-section of the ink-receptive layer intersects 1 or more of such pores per 4.0 square micrometers.

LX56. The ink-receptive layer according to any of embodiments LX1-LX51 which includes pores having a diameter of 0.1 micrometers or greater, and wherein such pores are present in a density such that a cross-section of the ink-receptive layer intersects 3 or more of such pores per 4.0 square micrometers.

LX57. The ink-receptive layer according to any of embodiments LX1-LX51 which includes pores having a diameter of 0.1 micrometers or greater, and wherein such pores are present in a density such that a cross-section of the ink-receptive layer intersects 8 or more of such pores per 4.0 square micrometers.

LX58. The ink-receptive layer according to any of embodiments LX1-LX57, wherein the pores have an average pore size of not more than 0.5 micrometers.

LX59. The ink-receptive layer according to any of embodiments LX1-LX57, wherein the pores have an average pore size of not more than 0.3 micrometers.

LX60. The ink-receptive layer according to any of embodiments LX1-LX59, wherein the pores are non-syntactic.

LT1. An ink-receptive layer comprising a mixture of:
   I) 0-15 wt %, based on the total weight of I), b), c), and d), of colloidal silica particles having an average particle size of 2.0-150 nm; and
   II) crosslinked polymer obtained by reacting to form crosslinks a mixture of:
      b) 75-90 wt %, based on the total weight of I), b), c), and d), of one or more polyester polymers;
      c) 10-25 wt %, based on the total weight of I), b), c), and d), of one or more polymers selected from the group consisting of polyurethane polymers and (meth)acrylate polymers; and
      d) 0.1-10 wt %, based on the total weight of I), b), c), and d), of one or more crosslinkers.

LT2. The ink-receptive layer according to embodiment LT1 wherein the colloidal silica particles are present in an amount of at least 1.0 wt %, based on the total weight of I), b), c), and d).

LT3. The ink-receptive layer according to embodiment LT1 wherein the colloidal silica particles are present in an amount of at least 2.0 wt %, based on the total weight of I), b), c), and d).

LT4. The ink-receptive layer according to any embodiment LT1 wherein the colloidal silica particles are present in an amount of at least 4.0 wt %, based on the total weight of I), b), c), and d).

LT5. The ink-receptive layer according to embodiment LT1 wherein the colloidal silica particles are present in an amount of at least 8.0 wt %, based on the total weight of I), b), c), and d).

LT6. The ink-receptive layer according to embodiment LT1 wherein the colloidal silica particles are present in an amount of at least 10.0 wt %, based on the total weight of I), b), c), and d).

LT7. The ink-receptive layer according to any of embodiments LT1-LT6 wherein the colloidal silica particles are present in an amount of not more than 12.0 wt %, based on the total weight of I), b), c), and d).

LT8. The ink-receptive layer according to any of embodiments LT1-LT5 wherein the colloidal silica particles are present in an amount of not more than 10.0 wt %, based on the total weight of I), b), c), and d).

LT9. The ink-receptive layer according to any of embodiments LT1-LT4 wherein the colloidal silica particles are present in an amount of not more than 8.0 wt %, based on the total weight of I), b), c), and d).

LT10. The ink-receptive layer according to any of embodiments LT1-LT9 wherein the colloidal silica particles have an average particle size of at least 4.0 nm.

LT11. The ink-receptive layer according to any of embodiments LT1-LT9 wherein the colloidal silica particles have an average particle size of at least 13.0 nm.

LT12. The ink-receptive layer according to any of embodiments LT1-LT11 wherein the colloidal silica particles have an average particle size of not more than 95.0 nm.

LT13. The ink-receptive layer according to any of embodiments LT1-LT11 wherein the colloidal silica particles have an average particle size of not more than 48.0 nm.

LT14. The ink-receptive layer according to any of embodiments LT1-LT11 wherein the colloidal silica particles have an average particle size of not more than 35.0 nm.

LT15. The ink-receptive layer according to any of embodiments LT1-LT11 wherein the colloidal silica particles have an average particle size of not more than 27.0 nm.

LT16. The ink-receptive layer according to any of embodiments LT1-LT15 wherein the one or more polyester polymers are present in an amount of at least 77.0 wt %, based on the total weight of b), c), and d).

LT17. The ink-receptive layer according to any of embodiments LT1-LT15 wherein the one or more polyester polymers are present in an amount of at least 80.0 wt %, based on the total weight of b), c), and d).

LT18. The ink-receptive layer according to any of embodiments LT1-LT15 wherein the one or more polyester polymers are present in an amount of at least 85.0 wt %, based on the total weight of b), c), and d).

LT19. The ink-receptive layer according to any of embodiments LT1-LT15 wherein the one or more polyester polymers are present in an amount of not more than 85.0 wt %, based on the total weight of b), c), and d).

LT20. The ink-receptive layer according to any of embodiments LT1-LT19 wherein the one or more polyester polymers are present in an amount of not more than 83.0 wt %, based on the total weight of b), c), and d).

LT21. The ink-receptive layer according to any of embodiments LT1-LT19 wherein the one or more polyester polymers are present in an amount of not more than 80.0 wt %, based on the total weight of b), c), and d).

LT22. The ink-receptive layer according to any of embodiments LT1-LT21 wherein c) is present in an amount of at least 12.0 wt %, based on the total weight of b), c), and d).
LT23. The ink-receptive layer according to any of embodiments LT1-LT21 wherein c) is present in an amount of at least 13.0 wt %, based on the total weight of b), c), and d).
LT24. The ink-receptive layer according to any of embodiments LT1-LT21 wherein c) is present in an amount of at least 14.0 wt %, based on the total weight of b), c), and d).
LT25. The ink-receptive layer according to any of embodiments LT1-LT24 wherein c) is present in an amount of not more than 22.0 wt %, based on the total weight of b), c), and d).
LT26. The ink-receptive layer according to any of embodiments LT1-LT24 wherein c) is present in an amount of not more than 20.0 wt %, based on the total weight of b), c), and d).
LT27. The ink-receptive layer according to any of embodiments LT1-LT24 wherein c) is present in an amount of not more than 18.0 wt %, based on the total weight of b), c), and d).
LT28. The ink-receptive layer according to any of embodiments LT1-LT24 wherein c) is present in an amount of not more than 15.0 wt %, based on the total weight of b), c), and d).
LT29. The ink-receptive layer according to any of embodiments LT1-LT28 wherein the one or more crosslinkers are present in an amount of at least 0.1 wt %, based on the total weight of b), c), and d).
LT30. The ink-receptive layer according to any of embodiments LT1-LT28 wherein the one or more crosslinkers are present in an amount of at least 1.0 wt %, based on the total weight of b), c), and d).
LT31. The ink-receptive layer according to any of embodiments LT1-LT28 wherein the one or more crosslinkers are present in an amount of at least 2.0 wt %, based on the total weight of b), c), and d).
LT32. The ink-receptive layer according to any of embodiments LT1-LT31 wherein the one or more crosslinkers are present in an amount of not more than 7.0 wt %, based on the total weight of b), c), and d).
LT33. The ink-receptive layer according to any of embodiments LT1-LT31 wherein the one or more crosslinkers are present in an amount of not more than 4.0 wt %, based on the total weight of b), c), and d).
LT34. The ink-receptive layer according to any of embodiments LT1-LT33 wherein the one or more polyester polymers include sulfonated polyester polymers.
LT35. The ink-receptive layer according to any of embodiments LT1-LT34 wherein the one or more polyester polymers include non-sulfonated polyester polymers.
LT36. The ink-receptive layer according to any of embodiments LT1-LT33 wherein the one or more polyester polymers are sulfonated polyester polymers.
LT37. The ink-receptive layer according to any of embodiments LT1-LT33 wherein the one or more polyester polymers are non-sulfonated polyester polymers.
LT38. The ink-receptive layer according to any of embodiments LT1-LT37 wherein c) includes one or more polyurethane polymers.
LT39. The ink-receptive layer according to any of embodiments LT1-LT38 wherein c) includes one or more polyurethane polymers having an aliphatic backbone.
LT40. The ink-receptive layer according to any of embodiments LT1-LT39 wherein c) includes one or more (meth) acrylate polymers.
LT41. The ink-receptive layer according to any of embodiments LT1-LT40 wherein c) includes one or more (meth) acrylate polymers in the form of core-shell particles.
LT42. The ink-receptive layer according to any of embodiments LT1-LT37 wherein c) is one or more polyurethane polymers.
LT43. The ink-receptive layer according to any of embodiments LT1-LT37 wherein c) is one or more polyurethane polymers having an aliphatic backbone.
LT44. The ink-receptive layer according to any of embodiments LT1-LT37 wherein c) is one or more (meth)acrylate polymers.
LT45. The ink-receptive layer according to any of embodiments LT1-LT37 wherein c) is one or more (meth)acrylate polymers in the form of core-shell particles.
LT46. The ink-receptive layer according to any of embodiments LT1-LT45 wherein the one or more crosslinkers include one or more polyaziridines.
LT47. The ink-receptive layer according to any of embodiments LT1-LT45 wherein the one or more crosslinkers are one or more polyaziridines.
LT48. The ink-receptive layer according to any of embodiments LT1-LT47 having a 60 degree gloss of at least 50.
LT49. The ink-receptive layer according to any of embodiments LT1-LT47 having a 60 degree gloss of at least 70.
LT50. The ink-receptive layer according to any of embodiments LT1-LT47 having a 60 degree gloss of at least 80.
LT51. The ink-receptive layer according to any of embodiments LT1-LT47 having a 60 degree gloss of at least 90.
LT52. The ink-receptive layer according to any of embodiments LT1-LT51 which includes pores having a diameter of 0.05 micrometers or greater, and wherein such pores are present in a density such that a cross-section of the ink-receptive layer intersects 1 or more of such pores per 4.0 square micrometers.
LT53. The ink-receptive layer according to any of embodiments LT1-LT51 which includes pores having a diameter of 0.05 micrometers or greater, and wherein such pores are present in a density such that a cross-section of the ink-receptive layer intersects 3 or more of such pores per 4.0 square micrometers.
LT54. The ink-receptive layer according to any of embodiments LT1-LT51 which includes pores having a diameter of 0.05 micrometers or greater, and wherein such pores are present in a density such that a cross-section of the ink-receptive layer intersects 8 or more of such pores per 4.0 square micrometers.
LT55. The ink-receptive layer according any of embodiments LT1-LT51 which includes pores having a diameter of 0.1 micrometers or greater, and wherein such pores are present in a density such that a cross-section of the ink-receptive layer intersects 1 or more of such pores per 4.0 square micrometers.
LT56. The ink-receptive layer according to any of embodiments LT1-LT51 which includes pores having a diameter of 0.1 micrometers or greater, and wherein such pores are present in a density such that a cross-section of the ink-receptive layer intersects 3 or more of such pores per 4.0 square micrometers.
LT57. The ink-receptive layer according to any of embodiments LT1-LT51 which includes pores having a diameter of 0.1 micrometers or greater, and wherein such pores are present in a density such that a cross-section of the ink-receptive layer intersects 8 or more of such pores per 4.0 square micrometers.

LT58. The ink-receptive layer according to any of embodiments LT1-LT57, wherein the pores have an average pore size of not more than 0.5 micrometers.
LT59. The ink-receptive layer according to any of embodiments LT1-LT57, wherein the pores have an average pore size of not more than 0.3 micrometers.
LT60. The ink-receptive layer according to any of embodiments LT1-LT59, wherein the pores are non-syntactic.
LT61. An ink-receptive layer which is the ink-receptive layer according to any one or more of embodiments LX1-LX60 or LT1-LT60.
ML1. A construction comprising the ink-receptive layer according to any of embodiments LX1-LX60 or LT1-LT61 bound to a substrate layer.
ML2. The construction according to embodiment ML1 wherein the substrate layer comprises a material selected from the group consisting of polyester, polyethylene terephthalate (PET), polypropylene (PP), vinyl and polyvinyl chloride (PVC).
ML3. The construction according to embodiment ML1 wherein the substrate layer comprises polyester.
ML4. The construction according to embodiment ML1 wherein the substrate layer comprises polyethylene terephthalate (PET).
ML5. The construction according to embodiment ML1 wherein the substrate layer comprises polypropylene (PP).
ML6. The construction according to embodiment ML1 wherein the substrate layer comprises polyvinyl chloride (PVC).
ML7. The construction according to any of embodiments ML1-ML6 wherein the ink-receptive layer is directly adjacent to and directly bound to the substrate layer.
ML8. The construction according to any of embodiments ML1-ML7 additionally comprising a layer of pressure sensitive adhesive bound to the substrate layer.
ML9. The construction according to embodiment ML8 wherein the layer of pressure sensitive adhesive is directly adjacent to and directly bound to the substrate layer.
MM1. A method comprising a step of coating the coatable composition according to any of embodiments CC1-CC48 or CT1-CT49.
MM2. The method according to embodiment MM1 additionally comprising a step of drying the coatable composition after coating.
MM3. The method according to embodiment MM1 or MM2 additionally comprising a step of obtaining by the coating and drying steps the ink-receptive layer according to any of embodiments LX1-LX60 or LT1-LT61.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or from other commercial chemical suppliers or may be synthesized by known methods. All parts, percentages, ratios, etc. in the examples and the rest of the specification are by weight, unless noted otherwise. The following abbreviations are used: m=meters; cm=centimeters; mm=millimeters; μm=micrometers; ft=feet; in=inch; RPM=revolutions per minute; kg=kilograms; oz=ounces; lb=pounds; Pa=Pascals; sec=seconds; min=minutes; and hr=hours. The terms "weight %", "% by weight", and "wt %" are used interchangeably.

| Materials | |
|---|---|
| Material | Description |
| AC | AC refers to a waterborne core-shell acrylate polymer latex (20 wt. % solids), prepared in a similar fashion as described in Example 1 of U.S. Pat. No. 5,461,125. In particular, a mixture of 78.92 parts of deionized water, 0.3 part Rhodacal ® DS-10 anionic surfactant (sodium dodecyl benzene sulfonate, available from Solvay), 0.28 part Igepal ® CA-897 nonionic surfactant (octylphenoxypoly(ethylenoxy)ethanol from Solvay) and 0.13 part ammonium hydroxide (29% aqueous solution) was stirred and heated under nitrogen in a 4-neck flask equipped with a reflux condenser, thermometer, mechanical stirrer, metering pump and a thermometer. When the temperature of the mixture reached 55° C., a solution of 13 parts ethyl acrylate (EA) and 3.23 parts methyl methacrylate (MMA) was added all at once to the flask contents, with vigorous agitation. The mixture was heated to 60° C. and 0.07 parts potassium persulfate were added. The reaction was allowed to exotherm, then was kept at 80° C., while a mixture of 2.60 parts ethyl acrylate, 1.42 parts N-vinyl pyrrolidone (NVP) and 0.04 parts silane coupling agent (gamma-methacryloxypropyltrimethoxysilane, available under the trade designation SILQUEST A-174 from Momentive Performance Materials, Inc.) was dripped in over a one-hour period. The reaction mixture was agitated and maintained at 80° C. for an additional two hours, after which it was quickly cooled to 25° C. and filtered to collect the stable latex polymer. Solids analysis showed 99.8% conversion of monomers. The resulting core-shell acrylate polymer latex has the following composition: Core: EA/MMA (80/20), $T_g$ = −6° C. (~100 nm). Shell: EA/NVP/Silane (64/35/1), $T_g$ = 2° C. (~5 nm), core/shell ratio: 80/20. |
| PE | PE refers to a water-dispersed co-polyester resin (25 wt. % solids) with a number average molecular weight of 15,000 g/mol for the base resin and $T_g$ of 20° C. for the base resin, available from Toyobo Co Ltd. (Osaka, Japan) under the trade designation VYLONAL MD-1480. |
| PU | PU refers to a water-borne polyurethane dispersion (34 wt. % solids), available from DSM NeoResins, Inc. (Wilmington, MA) under the trade designation NEOREZ R960. |

Materials

| Material | Description |
|---|---|
| NS | NS refers to an aqueous 20 nm silica sol (42 wt. % solids), available from Nalco Chemical Company (Naperville, IL) under the trade designation NALCO 2327. |
| FS | FS refers to a hydrophilic fumed silica powder, available from Cabot Corporation (Tuscola, IL) under the trade designation Cab-O-Sil M-5, further dispersed in water at 30 wt % solids using a high speed, saw toothed disperser blade. |
| XL | XL refers to a liquid, polyfunctional aziridine liquid cross-linker, available from DSM NeoResins, Inc. (Wilmington, MA) under the trade designation CX-100. |
| FCA1 | FCA1 refers to a foam control agent comprising a blend of polysiloxanes and hydrophobic solids, available from BYK USA, Inc. (Wallingford, CT) under the trade designation BYK-094. |
| FCA2 | FCA2 refers to a foam control agent comprising a blend of polysiloxanes and hydrophobic solids, available from BYK USA, Inc. (Wallingford, CT) under the trade designation BYK-024. |

Aqueous Coating Formulations

Aqueous coating formulations listed in Tables 1-35 below were prepared by sequentially combining silica components (if present), acrylate components (if present), polyester components, polyurethane components (if present), foam control agents (if present), and crosslinkers, with gentle shaking/stirring (~30 seconds) after addition of each component.

TABLE 1

Coating Formulation (Example 1, EX-1)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 56.31 | 14.08 | 43.68 |
| PU | 4.60 | 1.56 | 4.85 |
| NS | 38.15 | 15.64 | 48.53 |
| FCA1 | 0.0054 | 0.0054 | 0.017 |
| XL | 0.94 | 0.94 | 2.92 |
| Total | 100 | 32.23 | 100 |

TABLE 2

Coating Formulation (Example 2, EX-2)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 81.75 | 20.44 | 72.48 |
| PU | 4.01 | 1.36 | 4.83 |
| NS | 13.29 | 5.45 | 19.33 |
| FCA1 | 0.0054 | 0.0054 | 0.019 |
| XL | 0.94 | 0.94 | 3.34 |
| Total | 100 | 28.20 | 100 |

TABLE 3

Coating Formulation (Example 3, EX-3)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 65.59 | 16.40 | 53.31 |
| PU | 4.38 | 1.49 | 4.85 |
| NS | 29.08 | 11.92 | 38.77 |
| FCA1 | 0.0054 | 0.0054 | 0.018 |
| XL | 0.94 | 0.94 | 3.06 |
| Total | 100 | 30.76 | 100 |

TABLE 4

Formulation (Example 4, EX-4)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 76.18 | 19.04 | 64.84 |
| PU | 0.00 | 0.00 | 0.00 |
| NS | 22.88 | 9.38 | 31.94 |
| FCA1 | 0.0054 | 0.0054 | 0.019 |
| XL | 0.94 | 0.94 | 3.20 |
| Total | 100 | 29.37 | 100 |

TABLE 5

Coating Formulation (Example 5, EX-5)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 61.53 | 15.38 | 48.51 |
| PU | 0.00 | 0.00 | 0.00 |
| NS | 37.52 | 15.38 | 48.51 |
| FCA1 | 0.0054 | 0.0054 | 0.017 |
| XL | 0.94 | 0.94 | 2.97 |
| Total | 100 | 31.71 | 100 |

TABLE 6

Coating Formulation (Example 6, EX-6)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 67.90 | 16.98 | 56.19 |
| PU | 6.89 | 2.34 | 7.75 |
| NS | 24.27 | 9.95 | 32.94 |
| FCA2 | 0 | 0 | 0 |
| XL | 0.94 | 0.94 | 3.12 |
| Total | 100 | 30.21 | 100 |

TABLE 7

Coating Formulation (Example 7, EX-7)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 67.90 | 16.98 | 56.19 |
| PU | 6.89 | 2.34 | 7.75 |
| NS | 24.27 | 9.95 | 32.94 |
| FCA2 | 0.0020 | 0.0020 | 0.007 |
| XL | 0.94 | 0.94 | 3.11 |
| Total | 100 | 30.21 | 100 |

TABLE 8

Coating Formulation (Example 8, EX-8)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 67.90 | 16.97 | 56.18 |
| PU | 6.89 | 2.34 | 7.75 |
| NS | 24.27 | 9.95 | 32.93 |
| FCA2 | 0.0079 | 0.0079 | 0.026 |
| XL | 0.94 | 0.94 | 3.11 |
| Total | 100 | 30.21 | 100 |

TABLE 9

Coating Formulation (Example 9, EX-9)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 67.89 | 16.97 | 56.16 |
| PU | 6.89 | 2.34 | 7.75 |
| NS | 24.27 | 9.95 | 32.92 |
| FCA2 | 0.0154 | 0.0154 | 0.051 |
| XL | 0.94 | 0.94 | 3.11 |
| Total | 100 | 30.22 | 100 |

TABLE 10

Coating Formulation (Example 10, EX-10)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 67.89 | 16.97 | 56.15 |
| PU | 6.88 | 2.34 | 7.74 |
| NS | 24.27 | 9.95 | 32.92 |
| FCA2 | 0.0233 | 0.0233 | 0.077 |
| XL | 0.94 | 0.94 | 3.11 |
| Total | 100 | 30.23 | 100 |

TABLE 11

Coating Formulation (Example 11, EX-11)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 68.34 | 17.08 | 57.41 |
| PU | 6.93 | 2.36 | 7.92 |
| NS | 24.43 | 10.02 | 33.65 |
| FCA2 | 0.0080 | 0.0080 | 0.027 |
| XL | 0.29 | 0.29 | 0.99 |
| Total | 100 | 29.76 | 100 |

TABLE 12

Formulation (Example 12, EX-12)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 67.53 | 16.88 | 55.18 |
| PU | 6.85 | 2.33 | 7.61 |
| NS | 24.14 | 9.90 | 32.35 |
| FCA2 | 0.0079 | 0.0079 | 0.026 |
| XL | 1.48 | 1.48 | 4.83 |
| Total | 100 | 30.59 | 100 |

TABLE 13

Coating Formulation (Example 13, EX-13)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 91.71 | 22.93 | 87.26 |
| PU | 7.49 | 2.55 | 9.70 |
| NS | 0 | 0 | 0 |
| FCA1 | 0.0055 | 0.0055 | 0.021 |
| XL | 0.79 | 0.79 | 3.02 |
| Total | 100 | 26.27 | 100 |

TABLE 14

Coating Formulation (Example 14, EX-14)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 96.12 | 24.03 | 92.09 |
| PU | 0 | 0 | 0 |
| NS | 3.08 | 1.26 | 4.85 |
| FCA1 | 0.0055 | 0.0055 | 0.021 |
| XL | 0.79 | 0.79 | 3.04 |
| Total | 100 | 26.09 | 100 |

TABLE 15

Coating Formulation (Example 15, EX-15)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 86.96 | 21.74 | 80.07 |
| PU | 5.81 | 1.98 | 7.28 |
| NS | 6.43 | 2.64 | 9.71 |
| FCA1 | 0.0055 | 0.0055 | 0.020 |
| XL | 0.79 | 0.79 | 2.92 |
| Total | 100 | 27.15 | 100 |

TABLE 16

Coating Formulation (Example 16, EX-16)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 89.56 | 22.39 | 82.50 |
| PU | 0 | 0 | 0 |
| NS | 9.64 | 3.95 | 14.56 |
| FCA1 | 0.0055 | 0.0055 | 0.020 |
| XL | 0.79 | 0.79 | 2.92 |
| Total | 100 | 27.14 | 100 |

TABLE 17

Coating Formulation (Example 17, EX-17)

| Material | Material weight vs Coating Formulation weight (wt %) | Material solids vs Coating Formulation weight (wt %) | Material solids vs Coating Formulation weight (wt %) |
|---|---|---|---|
| AC | 7.69 | 1.54 | 4.84 |
| PE | 49.23 | 12.31 | 38.71 |
| PU | 4.53 | 1.54 | 4.84 |
| NS | 37.53 | 15.39 | 48.39 |
| FCA1 | 0.0057 | 0.0057 | 0.0179 |
| XL | 1.02 | 1.02 | 3.20 |
| Total | 100 | 31.79 | 100 |

TABLE 18

Coating Formulation (Example 18, EX-18)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 84.36 | 21.09 | 77.65 |
| PU | 11.63 | 3.95 | 14.56 |
| NS | 3.21 | 1.32 | 4.85 |
| FCA1 | 0.0055 | 0.0055 | 0.020 |
| XL | 0.79 | 0.79 | 2.92 |
| Total | 100 | 27.16 | 100 |

TABLE 19

Coating Formulation (Comparative Example 1, CE-1)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 71.52 | 17.88 | 63.04 |
| PU | 24.27 | 8.25 | 29.09 |
| NS | 3.35 | 1.38 | 4.85 |
| FCA1 | 0.0057 | 0.0057 | 0.0201 |
| XL | 0.85 | 0.85 | 3.00 |
| Total | 100 | 28.36 | 100 |

TABLE 20

Coating Formulation (Comparative Example 2, CE-2)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 52.53 | 13.13 | 43.51 |
| PU | 42.91 | 14.59 | 48.34 |
| NS | 3.56 | 1.46 | 4.83 |
| FCA1 | 0.0057 | 0.0057 | 0.0189 |
| XL | 1.00 | 1.00 | 3.30 |
| Total | 100 | 30.18 | 100 |

TABLE 21

Coating Formulation (Comparative Example 3, CE-3)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 40.45 | 10.11 | 29.01 |
| PU | 4.96 | 1.69 | 4.83 |
| NS | 53.44 | 21.91 | 62.84 |
| FCA1 | 0.0057 | 0.0057 | 0.0163 |
| XL | 1.15 | 1.15 | 3.30 |
| Total | 100 | 34.86 | 100 |

TABLE 22

Coating Formulation (Comparative Example 4, CE-4)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 7.54 | 1.89 | 4.83 |
| PU | 22.18 | 7.54 | 19.34 |
| NS | 68.98 | 28.28 | 72.51 |
| FCA1 | 0.0057 | 0.0057 | 0.0146 |
| XL | 1.29 | 1.29 | 3.30 |
| Total | 100 | 39.00 | 100 |

TABLE 23

Coating Formulation (Comparative Example 5, CE-5)

| Material | Material weight vs Coating Formulation weight (wt %) | Material solids vs Coating Formulation weight (wt %) | Material solids vs Coating Formulation weight (wt %) |
|---|---|---|---|
| AC | 8.14 | 1.63 | 4.83 |
| PE | 39.08 | 9.77 | 28.98 |
| PU | 0 | 0 | 0 |
| NS | 51.63 | 21.17 | 62.78 |
| FCA1 | 0.0057 | 0.0057 | 0.0169 |
| XL | 1.15 | 1.15 | 3.40 |
| Total | 100 | 33.72 | 100 |

TABLE 24

Coating Formulation (Comparative Example 6, CE-6)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 70.28 | 17.57 | 64.84 |
| PU | 0 | 0 | 0 |
| FS | 28.85 | 8.65 | 31.94 |
| FCA1 | 0.0052 | 0.0052 | 0.0192 |
| XL | 0.87 | 0.87 | 3.20 |
| Total | 100 | 27.10 | 100 |

TABLE 25

Coating Formulation (Comparative Example 7, CE-7)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 54.58 | 13.64 | 43.64 |
| PU | 22.29 | 7.58 | 24.24 |
| NS | 22.18 | 9.10 | 29.09 |
| FCA1 | 0.0054 | 0.0054 | 0.0174 |
| XL | 0.94 | 0.94 | 3.01 |
| Total | 100 | 31.27 | 100 |

TABLE 26

Coating Formulation (Comparative Example 8, CE-8)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 48.53 | 12.13 | 37.22 |
| PU | 17.07 | 5.80 | 17.81 |
| NS | 33.45 | 13.71 | 42.07 |
| FCA1 | 0.0054 | 0.0054 | 0.0167 |
| XL | 0.94 | 0.94 | 2.89 |
| Total | 100 | 32.6 | 100 |

TABLE 27

Coating Formulation (Comparative Example 9, CE-9)

| Material | Material weight vs Coating Formulation weight (wt %) | Material solids vs Coating Formulation weight (wt %) | Material solids vs Coating Formulation weight (wt %) |
|---|---|---|---|
| AC | 0 | 0 | 0 |
| PE | 33.52 | 8.38 | 24.31 |
| PU | 24.65 | 8.38 | 24.31 |
| NS | 40.88 | 16.76 | 48.63 |
| FCA1 | 0.0054 | 0.0054 | 0.0158 |
| XL | 0.94 | 0.94 | 2.73 |
| Total | 100 | 34.47 | 100 |

TABLE 28

Coating Formulation (Comparative Example 10, CE-10)

| Material | Material weight vs Coating Formulation weight (wt %) | Material solids vs Coating Formulation weight (wt %) | Material solids vs Coating Formulation weight (wt %) |
|---|---|---|---|
| AC | 4.66 | 0.93 | 2.91 |
| PE | 46.43 | 11.61 | 36.23 |
| PU | 15.86 | 5.39 | 16.83 |
| NS | 32.10 | 13.16 | 41.08 |
| FCA1 | 0.0054 | 0.0054 | 0.0170 |
| XL | 0.94 | 0.94 | 2.94 |
| Total | 100 | 32.04 | 100 |

TABLE 29

Coating Formulation (Comparative Example 11, CE-11)

| Material | Material weight vs Coating Formulation weight (wt %) | Material solids vs Coating Formulation weight (wt %) | Material solids vs Coating Formulation weight (wt %) |
|---|---|---|---|
| AC | 8.85 | 1.77 | 5.81 |
| PE | 49.54 | 12.39 | 40.69 |
| PU | 19.08 | 6.49 | 21.32 |
| NS | 21.58 | 8.85 | 29.07 |
| FCA1 | 0.0054 | 0.0054 | 0.0179 |
| XL | 0.94 | 0.94 | 3.09 |
| Total | 100 | 30.44 | 100 |

TABLE 30

Coating Formulation (Comparative Example 12, CE-12)

| Material | Material weight vs Coating Formulation weight (wt %) | Material solids vs Coating Formulation weight (wt %) | Material solids vs Coating Formulation solids (wt %) |
|---|---|---|---|
| AC | 9.17 | 1.83 | 5.82 |
| PE | 44.40 | 11.10 | 35.24 |
| PU | 14.68 | 4.99 | 15.85 |
| NS | 30.80 | 12.63 | 40.09 |
| FCA1 | 0.0054 | 0.0054 | 0.0173 |
| XL | 0.94 | 0.94 | 2.99 |
| Total | 100 | 31.5 | 100 |

TABLE 31

Coating Formulation (Comparative Example 13, CE-13)

| Material | Material weight vs Coating Formulation weight (wt %) | Material solids vs Coating Formulation weight (wt %) | Material solids vs Coating Formulation solids (wt %) |
|---|---|---|---|
| AC | 9.08 | 1.82 | 5.82 |
| PE | 50.84 | 12.71 | 40.73 |
| PU | 4.45 | 1.51 | 4.85 |
| NS | 34.69 | 14.22 | 45.57 |
| FCA1 | 0.0054 | 0.0054 | 0.0175 |
| XL | 0.94 | 0.94 | 3.02 |
| Total | 100 | 31.21 | 100 |

TABLE 32

Coating Formulation (Comparative Example 14, CE-14)

| Material | Material weight vs Coating Formulation weight (wt %) | Material solids vs Coating Formulation weight (wt %) | Material solids vs Coating Formulation solids (wt %) |
|---|---|---|---|
| AC | 9.61 | 1.92 | 5.83 |
| PE | 32.02 | 8.01 | 24.28 |
| PU | 20.72 | 7.04 | 21.37 |
| NS | 36.71 | 15.05 | 45.65 |
| FCA1 | 0.0054 | 0.0054 | 0.0165 |
| XL | 0.94 | 0.94 | 2.85 |
| Total | 100 | 32.97 | 100 |

TABLE 33

Coating Formulation (Comparative Example 15, CE-15)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 63.66 | 15.92 | 53.26 |
| PU | 21.28 | 7.23 | 24.21 |
| NS | 14.12 | 5.79 | 19.37 |
| FCA1 | 0.0054 | 0.0054 | 0.0182 |
| XL | 0.94 | 0.94 | 3.15 |
| Total | 100 | 29.88 | 100 |

TABLE 34

Formulation (Comparative Example 16, CE-16)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 70.65 | 17.66 | 59.73 |
| PU | 9.77 | 3.32 | 11.23 |
| NS | 18.64 | 7.64 | 25.85 |
| FCA1 | 0.0054 | 0.0054 | 0.0184 |
| XL | 0.94 | 0.94 | 3.18 |
| Total | 100 | 29.57 | 100 |

TABLE 35

Coating Formulation (Comparative Example 17, CE-17)

| Material | Material weight vs Coating Formulation weight (wt %) | Material solids vs Coating Formulation weight (wt %) | Material solids vs Coating Formulation solids (wt %) |
|---|---|---|---|
| AC | 0 | 0 | 0 |
| PE | 77.01 | 19.25 | 68.02 |
| PU | 12.13 | 4.13 | 14.58 |
| NS | 10.06 | 4.13 | 14.58 |
| FCA1 | 0.0055 | 0.0055 | 0.0193 |
| XL | 0.79 | 0.79 | 2.80 |
| Total | 100 | 28.30 | 100 |

Mayer Rod Coating

Coating Formulations described in Tables 1-35 were coated onto untreated 2 mil (0.051 mm) white polyester (PET) substrates (3M, Greenville, SC) using a #3 Mayer rod (available from RD Specialties, Inc., Webster, NY). The coated samples were heated to 200° F. for 30 sec to effect drying. Unless otherwise indicated, coated samples employing PET substrates were used for printing and testing.

Gloss Testing

The gloss of coated samples was measured using a micro-TRI-gloss meter (a portable glossmeter available from BYK-Gardner USA, Columbia MD), which simultaneously measured gloss at 20, 60, and 85 degrees. Unless otherwise noted, three gloss measurements from three different locations from each coated sample were taken, and the gloss value results averaged. The averaged results are reported for the 60 degree measurement and are presented in Table 36, below.

TABLE 36

Gloss results for coated samples (PET substrates)

| Example | Gloss (60 degrees) |
|---|---|
| EX-1 | not tested |
| EX-2 | 94.9 |
| EX-3 | 90.9 |
| EX-4 | 94.6 |
| EX-5 | 87.0 |
| EX-6 | 91.3 |
| EX-7 | 91.5 |
| EX-8 | 91.8 |
| EX-9 | 91.9 |
| EX-10 | 91.8 |
| EX-11 | 91.3 |
| EX-12 | 91.1 |
| EX-13 | 98.2 |
| EX-14 | 98.8 |

TABLE 36-continued

Gloss results for coated samples (PET substrates)

| Example | Gloss (60 degrees) |
|---|---|
| EX-15 | 97.1 |
| EX-16 | 97.6 |
| EX-17 | 83.2 |
| EX-18 | 97.2 |
| CE-1 | 95.1 |
| CE-2 | 93.5 |
| CE-3 | 68.3 |
| CE-4 | 71.5 |
| CE-5 | 68.8 |
| CE-6 | 53.2 |
| CE-7 | not tested |
| CE-8 | not tested |
| CE-9 | not tested |
| CE-10 | not tested |
| CE-11 | not tested |
| CE-12 | not tested |
| CE-13 | not tested |
| CE-14 | not tested |
| CE-15 | 93.4 |
| CE-16 | 94.0 |
| CE-17 | 95.8 |

The results in the above table show that the inventive coating formulations maintain high gloss, even with high loadings of 20 nanometer diameter silica particles. On the other hand, Comparative Example CE-6, which included fumed silica, displayed low gloss.

Coating Anchorage Testing

Anchorage of coatings to PET substrates was evaluated in the following manner. Coated PET samples having dimensions of at least 3 inches×3 inches (7.6 cm×7.6 cm) were secured onto flat, non-abrasive surfaces with strong-tack adhesive tape (available from 3M Company under the trade designation 3M Filament tape No. 893). The coated PET sample was scored using a cross hatch cutter with the blade spacing of 1 mm (available from BYK-Gardner USA, Columbia MD) diagonally from top left to bottom right and then top right to bottom left which created scored array of diamond patterns. Mild force was applied while scoring the sample. A 1 inch×3 inches (2.5 cm×7.6 cm) strip of high-performance, transparent cellophane film tape (available from 3M Company under the trade designation Scotch Cellophane Film Tape 610) was laminated over the scored sample. Moderate thumb pressure was applied to the laminated area. A fine point permanent marker was used to mark the outer borders of the laminated filament tape to delineate two one-square-inch areas. The left square inch area was labeled "Slow Peel". The right square inch area was labeled "Fast Peel". The cellophane tape was peeled at approximately 12 in/min rate and at 180 degree peel angle for Slow Peel area. Once slow peeling approached the Fast Peel area, the cellophane tape was peeled at approximately 36 in/min rate and at 180 degree peel angle. Percent coating remaining was analyzed by observing loss of coating from the PET substrate, and percent (%) coating remaining was reported. Table 37 shows results of coating anchorage to PET substrate, for coatings derived from various coating formulations.

TABLE 37

Coating anchorage of coated samples (PET substrates)

| Example | Remaining Coating (%), Slow Peel | Remaining Coating (%), Fast Peel |
|---|---|---|
| EX-1 | 99% | 95% |
| EX-2 | 99% | 99% |
| EX-3 | 100% | 100% |
| EX-4 | 99% | 99% |
| EX-5 | 100% | 100% |
| EX-6 | 100% | 100% |
| EX-7 | 100% | 100% |
| EX-8 | 100% | 100% |
| EX-9 | 100% | 100% |
| EX-10 | 100% | 100% |
| EX-11 | 100% | 100% |
| EX-12 | 100% | 100% |
| EX-13 | 100% | 100% |
| EX-14 | 100% | 100% |
| EX-15 | 100% | 100% |
| EX-16 | 100% | 90% |
| EX-17 | 100% | 100% |
| EX-18 | 100% | 100% |
| CE-1 | 80% | 80% |
| CE-2 | 5% | 95% |
| CE-3 | 100% | 100% |
| CE-4 | 10% | 5% |
| CE-5 | 100% | 100% |
| CE-7 | 99% | 97% |
| CE-8 | 100% | 95% |
| CE-9 | 95% | 5% |
| CE-10 | 100% | 100% |
| CE-11 | 100% | 100% |
| CE-12 | 100% | 100% |
| CE-13 | 100% | 99% |
| CE-14 | 99% | 5% |
| CE-15 | 75% | 75% |
| CE-16 | 100% | 100% |
| CE-17 | 100% | 100% |

Ink Receptivity Testing

The ink receptivity of the coated samples (PET substrates) by flexographic and UV inkjet printing was evaluated as follows.

A. Flexographic Printing

Coated samples were cut to approximately 7 inches×12 inches (17.8 cm×30.5 cm). A hand ink proofer (available from Pamarco, Inc., Roselle, NJ) was cleaned thoroughly with water and dried. Coated samples were secured to a flat surface using filament tape, with the longer dimension running down-web. A disposable pipette was used to draw water-borne black ink (available from Siegwerk Environmental Inks, Morganton, NC), and was dispensed between the anilox and stainless steel cylinder of the hand ink proofer. To ensure good ink distribution, the ink-loaded hand ink proofer was rolled back and forth within a small distance at the top of the coated sample, where the printing was to begin. Ink was then applied with single draw, going from the top to the bottom of the coated sample. The ink-coated sample was inspected for uniformity and defects. The ink-coated sample was allowed to dry for a few minutes under ambient conditions before further testing.

B. UV Inkjet Printing

Coated samples were cut to approximately 5 inches×10 inches (12.7 cm×25.4 cm) dimensions, were affixed to a slide table transport mechanism 150 ft/min (0.762 m/s), and were printed with cyan, magenta, and black inks in various patterns (color blocks, color barcodes, 2-D barcodes, and color letters) using a Prototype & Production Systems, Inc. DICElab process development printer equipped with Fujifilm StarFire SG1024 print heads using PPSI DICEjet Gamma ink (400 dpi×400 dpi resolution), and cured inline using an Omnicure AC475-305 UV LED lamp.

Ink Anchorage Testing

Anchorage of the ink (either flexographically printed with the hand ink proofer or UV printed) to the coatings of the coated samples was evaluated in the same fashion as the Coating Anchorage Testing as previously described, but printed samples (from either flexographic or UV inkjet printing) were used rather than unprinted samples. Percent ink remaining was analyzed by observing loss of ink from the coating of the coated sample, and percent (%) ink remaining was reported.

Print Quality Evaluation

UV inkjet print quality on coated samples was assessed qualitatively on a 1 to 5 scale based on: resolution of the print, sharpness, and observable quality of fonts, numbers, and images. A print quality rating of 5 indicates a perfect (or nearly perfect) observable print with excellent resolution and image quality. In contrast, a print quality rating of 1 means poor observable print, which includes ink smearing and signs of streaking.

Scratch Resistance and Smear Resistance Evaluation

Flexographic print scratch resistance on coated samples was qualitatively assessed on a 1 to 5 scale by scratching the printed surface with the thumbnail and assessing the result. A scratch resistance rating of 5 indicates excellent resistance to thumb nail abrasion, whereas a rating of 1 indicates complete removal of ink upon thumb nail abrasion.

Flexographic print smear resistance on coated was qualitatively assessed on a 1 to 5 scale by smearing the printed surface with thumb pressure and assessing the result. A smear resistance rating 5 indicates that the sample showed excellent (e.g., complete) resistance to ink smearing, and rating 1 indicates a complete removal of ink upon smearing.

TABLE 38

Print anchorage, scratch resistance, and smear resistance for flexographically printed coated samples

| Example | Remaining Ink (%) on coated sample | | Scratch Resistance Rating | Smear Resistance Rating |
|---|---|---|---|---|
| | Slow Peel | Fast Peel | | |
| EX-1 | 100% | 100% | 3 | 5 |
| EX-2 | 100% | 100% | 3 | 5 |
| EX-3 | 100% | 100% | 3 | 5 |
| EX-4 | 100% | 100% | 3 | 5 |
| EX-5 | 100% | 100% | 4 | 5 |
| EX-6 | 100% | 100% | 3 | 5 |
| EX-7 | 100% | 100% | 3 | 5 |
| EX-8 | 100% | 100% | 3 | 5 |
| EX-9 | 100% | 100% | 3 | 5 |
| EX-10 | 100% | 100% | 3 | 5 |
| EX-11 | 100% | 100% | 4 | 5 |
| EX-12 | 100% | 100% | 3 | 5 |
| EX-13 | 100% | 100% | 3 | 5 |
| EX-14 | 100% | 100% | 3 | 5 |
| EX-15 | 100% | 100% | 3 | 4 |
| EX-16 | 100% | 100% | 3 | 5 |
| EX-17 | 100% | 100% | 3 | 5 |
| EX-18 | 100% | 100% | 3 | 5 |
| CE-1 | 100% | 100% | 2 | 5 |
| CE-2 | 99% | 25% | 2 | 5 |
| CE-3 | 95% | 90% | 3 | 5 |
| CE-4 | 5% | 5% | 1 | 5 |
| CE-5 | 10% | 10% | 3 | 5 |
| CE-7 | 100% | 100% | 2 | 5 |
| CE-8 | 100% | 100% | 2 | 5 |
| CE-9 | 100% | 100% | 2 | 5 |
| CE-10 | 100% | 100% | 3 | 5 |
| CE-11 | 100% | 100% | 2 | 5 |
| CE-12 | 100% | 100% | 3 | 5 |
| CE-13 | 100% | 100% | 3 | 5 |
| CE-14 | 100% | 100% | 2 | 5 |
| CE-15 | 100% | 100% | 3 | 5 |
| CE-16 | 100% | 100% | 3 | 5 |
| CE-17 | 100% | 100% | 3 | 5 |

TABLE 39

Print quality of UV inkjet-printed coated samples

| Example | Print quality of magenta color block | Print quality of black color block | Print quality of fonts | Print quality of barcode | Resolution |
|---|---|---|---|---|---|
| EX-1 | 5 | 4 | 5 | 5 | 5 |
| EX-2 | 5 | 3 | 5 | 5 | 4 |
| EX-3 | 5 | 3 | 5 | 5 | 5 |
| EX-4 | 5 | 3 | 5 | 5 | 5 |
| EX-5 | 5 | 3 | 5 | 5 | 5 |
| EX-6 | 5 | 3 | 5 | 5 | 4 |
| EX-7 | 5 | 3 | 5 | 5 | 4 |
| EX-8 | 5 | 3 | 5 | 5 | 4 |
| EX-9 | 5 | 3 | 5 | 5 | 5 |
| EX-10 | 5 | 3 | 5 | 5 | 3 |
| EX-11 | 5 | 3 | 5 | 5 | 5 |
| EX-12 | 5 | 3 | 5 | 5 | 5 |
| EX-13 | 4 | 4 | 5 | 4 | 4 |
| EX-14 | 4 | 3 | 5 | 4 | 4 |
| EX-15 | 4 | 3 | 5 | 5 | 4 |
| EX-16 | 4 | 3 | 5 | 4 | 4 |
| EX-17 | 5 | 3 | 5 | 5 | 4 |
| EX-18 | 4 | 4 | 5 | 5 | 4 |
| CE-1 | 5 | 4 | 5 | 5 | 5 |
| CE-2 | 5 | 4 | 5 | 5 | 5 |
| CE-3 | 5 | 4 | 5 | 5 | 5 |
| CE-4 | 5 | 3 | 5 | 5 | 4 |
| CE-5 | 5 | 3 | 5 | 5 | 4 |
| CE-7 | 5 | 4 | 5 | 5 | 5 |
| CE-8 | 5 | 4 | 5 | 5 | 5 |
| CE-9 | 5 | 4 | 5 | 5 | 5 |
| CE-10 | 5 | 3 | 5 | 5 | 5 |
| CE-11 | 5 | 3 | 5 | 5 | 5 |
| CE-12 | 4 | 3 | 5 | 5 | 5 |
| CE-13 | 4 | 3 | 5 | 5 | 5 |
| CE-14 | 4 | 3 | 5 | 5 | 5 |
| CE-15 | 5 | 3 | 5 | 5 | 5 |
| CE-16 | 5 | 3 | 5 | 5 | 5 |
| CE-17 | 4 | 3 | 5 | 4 | 4 |

TABLE 40

Print anchorage for UV inkjet-printed block colors on coated samples

| Example | Remaining Ink (%) on coated sample | | |
|---|---|---|---|
| | Magenta | Cyan | Black |
| EX-1 | 90% | 99% | 99% |
| EX-2 | 100% | 100% | 100% |
| EX-3 | 99% | 100% | 100% |
| EX-4 | 100% | 100% | 100% |
| EX-5 | 97% | 99% | 99% |

TABLE 40-continued

Print anchorage for UV inkjet-printed block colors on coated samples

| Example | Remaining Ink (%) on coated sample | | |
|---|---|---|---|
| | Magenta | Cyan | Black |
| EX-6 | 100% | 100% | 100% |
| EX-7 | 99% | 100% | 100% |
| EX-8 | 99% | 100% | 100% |
| EX-9 | 99% | 100% | 100% |
| EX-10 | 100% | 100% | 100% |
| EX-11 | 99% | 100% | 99% |
| EX-12 | 100% | 100% | 100% |
| EX-13 | 100% | 100% | 100% |
| EX-14 | 100% | 100% | 100% |
| EX-15 | 100% | 100% | 100% |
| EX-16 | 99% | 100% | 100% |
| EX-17 | 60% | 99% | 97% |
| EX-18 | 99% | 100% | 100% |
| CE-1 | 95% | 100% | 100% |
| CE-2 | 15% | 97% | 75% |
| CE-3 | 25% | 80% | 95% |
| CE-4 | 1% | 25% | 25% |
| CE-5 | 10% | 60% | 75% |
| CE-7 | 90% | 99% | 97% |
| CE-8 | 25% | 99% | 97% |
| CE-9 | 5% | 70% | 85% |
| CE-10 | 40% | 99% | 97% |
| CE-11 | 97% | 99% | 99% |
| CE-12 | 95% | 99% | 99% |
| CE-13 | 97% | 99% | 99% |
| CE-14 | 30% | 95% | 95% |
| CE-15 | 50% | 99% | 97% |
| CE-16 | 100% | 100% | 100% |
| CE-17 | 97% | 100% | 99% |

TABLE 41

Print anchorage for UV inkjet-printed bar codes on coated samples

| Example | Remaining Ink (%) on coated sample | |
|---|---|---|
| | Black 2-D barcode | Blue 2-D barcode |
| EX-1 | 99% | 99% |
| EX-2 | 100% | 100% |
| EX-3 | 100% | 100% |
| EX-4 | 100% | 100% |
| EX-5 | 99% | 97% |
| EX-6 | 100% | 100% |
| EX-7 | 99% | 99% |
| EX-8 | 100% | 100% |
| EX-9 | 100% | 100% |
| EX-10 | 100% | 100% |
| EX-11 | 100% | 99% |
| EX-12 | 100% | 100% |
| EX-13 | 100% | 100% |
| EX-14 | 100% | 100% |
| EX-15 | 100% | 100% |
| EX-16 | 100% | 100% |
| EX-17 | 99% | 99% |
| EX-18 | 100% | 100% |
| CE-1 | 100% | 100% |
| CE-2 | 99% | 99% |
| CE-3 | 50% | 50% |
| CE-4 | 50% | 50% |
| CE-5 | 75% | 50% |
| CE-7 | 99% | 99% |
| CE-8 | 99% | 95% |
| CE-9 | 95% | 75% |
| CE-10 | 99% | 99% |
| CE-11 | 99% | 99% |
| CE-12 | 99% | 99% |
| CE-13 | 99% | 99% |
| CE-14 | 75% | 75% |
| CE-15 | 99% | 99% |
| CE-16 | 100% | 100% |
| CE-17 | 99% | 99% |

Substrate Variation

Additional print assessment tests were done for Coating Formulation EX-12 coated on to different film substrates—polypropylene (PP) and polyvinyl chloride (PVC). Treated PP film (66 μm thickness) was obtained from Jindal Films America LLC (LaGrange, GA) and used as received. PVC film (90 μm thickness) was obtained from Mississippi Polymers (Corinth, MS) and pretreated using SSA EXTENDER/OVERPRINT* 440# chemical (Flint Group Narrow Web, Anniston, AL) prior to coating. Coating Formulation EX-12 was coated onto Treated PP film and Treated PVC film substrates using Mayer Rod Coating in the same manner as previously described for PET substrates. Flexographic and UV inkjet printing onto the Treated PP and Treated PVC coated substrates were evaluated in the same fashion as previously described for PET coated substrates. The results are shown in Tables 42-45.

TABLE 42

Print anchorage, scratch resistance, and smear resistance for flexographically-printed coated samples (PET, Treated PP, and Treated PVC substrates), employing Coating Formulation EX-12

| Substrate film | Ink Anchorage (% Ink Remaining on Sample) | | Scratch Resistance Rating | Smear Resistance Rating |
|---|---|---|---|---|
| | Slow Peel | Fast Peel | | |
| PET | 100% | 100% | 3 | 5 |
| Treated PP | 95% | 95% | 3 | 4 |
| Treated PVC | 50% | 75% | 3 | 4 |

TABLE 43

Print quality attributes for UV inkjet-printed coated samples (PET, Treated PP, and Treated PVC substrates), employing Coating Formulation EX-12

| Substrate film | Print quality in magenta color block | Print quality in black color block | Print quality of fonts | Print quality of barcodes | Resolution |
|---|---|---|---|---|---|
| PET | 5 | 3 | 5 | 5 | 5 |
| Treated PP | 5 | 3 | 5 | 5 | 4 |
| Treated PVC | 4 | 3 | 5 | 4 | 4 |

TABLE 44

Print anchorage attributes for UV inkjet-printed block colors on coated samples (PET, Treated PP, and Treated PVC substrates), employing Coating Formulation EX-12

| Substrate | Average Ink Anchorage (% Ink Remaining) | | |
|---|---|---|---|
| film | Magenta | Cyan | Black |
| PET | 100% | 100% | 100% |
| Treated PP | 100% | 100% | 100% |
| Treated PVC | 95% | 99% | 99% |

TABLE 45

Print Anchorage attributes for UV inkjet-printed 2-D barcodes on coated samples (PET, Treated PP, and Treated PVC substrates), employing Coating Formulation EX-12

| Substrate | Average Ink Anchorage (% Ink Remaining) | |
|---|---|---|
| film | Black 2-D barcode | Blue 2-D barcode |
| PET | 100% | 100% |
| Treated PP | 100% | 100% |
| Treated PVC | 99% | 97% |

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A coatable composition for formation of an ink-receptive layer, wherein the coatable composition comprises a mixture of:
   a) 38 weight percent to 60 weight percent, based on the total weight of a), b), c), and d), of colloidal silica particles having an average particle size of 2.0 to 150 nanometers;
   b) 30 weight percent to 60 weight percent, based on the total weight of a), b), c), and d), of one or more polyester polymers;
   c) 0 weight percent to 10 weight percent, based on the total weight of a), b), c), and d), of one or more polymers selected from the group consisting of polyurethane polymers and (meth)acrylate polymers, provided that the (meth)acrylate polymers are present in an amount of not more than 2 weight percent, based on the total weight of a), b), c), and d); and
   d) 2 weight percent to 10 weight percent, based on the total weight of a), b), c), and d), of one or more crosslinkers.

2. The coatable composition of claim 1 which is an aqueous suspension.

3. The coatable composition of claim 1, wherein the one or more polyurethane polymers are present in an amount of not more than 4.0 weight percent, based on the total weight of a), b), c), and d).

4. An ink-receptive layer comprising a mixture of:
   I) 38 weight percent to 60 weight percent, based on the total weight of I), b), c), and d), of colloidal silica particles having an average particle size of 2.0 to 150 nanometers; and
   II) crosslinked polymer obtained by reacting to form crosslinks a mixture of:
      b) 30 weight percent to 60 weight percent, based on the total weight of I), b), c), and d), of one or more polyester polymers;
      c) 0 weight percent to 10 weight percent, based on the total weight of I), b), c), and d), of one or more polymers selected from the group consisting of polyurethane polymers and (meth)acrylate polymers, provided that the (meth)acrylate polymers are present in an amount of not more than 2 weight percent, based on the total weight of a), b), c), and d); and
      d) 2 weight percent to 10 weight percent, based on the total weight of I), b), c), and d), of one or more crosslinkers.

5. The ink-receptive layer of claim 4, wherein the one or more polyurethane polymers are present in an amount of not more than 4.0 weight percent, based on the total weight of I), b), c), and d).

6. A construction comprising the ink-receptive layer of claim 4 bound to a substrate layer comprising a material selected from the group consisting of polyester, polyethylene terephthalate, polypropylene, vinyl, and polyvinyl chloride.

7. The ink-receptive layer of claim 4, wherein the one or more crosslinkers comprises a polyfunctional aziridine.

8. The ink-receptive layer of claim 4, wherein c) is present in an amount of 0.0 weight percent, based on the total weight of a), b), c), and d).

9. The ink-receptive layer of claim 4, wherein c) includes one or more polyurethane polymers having an aliphatic backbone.

10. The coatable composition of claim 1, wherein the one or more crosslinkers comprises a polyfunctional aziridine.

11. The coatable composition of claim 1, wherein c) is present in an amount of 0.0 weight percent, based on the total weight of a), b), c), and d).

12. The coatable composition of claim 1, wherein c) includes one or more polyurethane polymers having an aliphatic backbone.

13. An ink-receptive layer comprising a mixture of:
   I) 27 weight percent to 60 weight percent, based on the total weight of I), b), c), and d), of colloidal silica particles having an average particle size of 2.0 to 150 nanometers; and
   II) crosslinked polymer obtained by reacting to form crosslinks a mixture of:
      b) 30 weight percent to 71 weight percent, based on the total weight of I), b), c), and d), of one or more polyester polymers;
      c) 0 weight percent to 10 weight percent, based on the total weight of I), b), c), and d), of one or more polymers selected from the group consisting of polyurethane polymers and (meth)acrylate polymers, provided that the (meth)acrylate polymers are present in an amount of not more than 2 weight percent, based on the total weight of a), b), c), and d); and
      d) 2 weight percent to 10 weight percent, based on the total weight of I), b), c), and d), of one or more crosslinkers.

14. The ink-receptive layer of claim 13, wherein the one or more crosslinkers comprises a polyfunctional aziridine.

15. The ink-receptive layer of claim 13, wherein c) is present in an amount of 0.0 weight percent, based on the total weight of a), b), c), and d).

16. The ink-receptive layer of claim 13, wherein c) includes one or more polyurethane polymers having an aliphatic backbone.

17. The ink-receptive layer of claim 13, wherein the ink-receptive layer has 0 weight percent (meth)acrylate polymers.

18. The ink-receptive layer of claim 4, wherein the ink-receptive layer has 0 weight percent (meth)acrylate polymers.

19. The coatable composition of claim 1, wherein the one or more (meth)acrylate polymers are in the form of core-shell particles.

20. The coatable composition of claim 1, wherein the coatable composition has 0 weight percent (meth)acrylate polymers.

* * * * *